(12) United States Patent
Lei et al.

(10) Patent No.: US 12,621,782 B2
(45) Date of Patent: May 5, 2026

(54) TIMING ADVANCE VALIDATION ENHANCEMENTS FOR PRE-CONFIGURED UPLINK RESOURCES

(71) Applicant: QUALCOMM Incorporated, San Diego, CA (US)

(72) Inventors: Jing Lei, San Diego, CA (US); Alexandros Manolakos, Escondido, CA (US); Muhammad Nazmul Islam, Littleton, MA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 18/003,903

(22) PCT Filed: Aug. 9, 2021

(86) PCT No.: PCT/US2021/045222
§ 371 (c)(1),
(2) Date: Dec. 29, 2022

(87) PCT Pub. No.: WO2022/035762
PCT Pub. Date: Feb. 17, 2022

(65) Prior Publication Data
US 2023/0262631 A1 Aug. 17, 2023

(30) Foreign Application Priority Data
Aug. 10, 2020 (GR) ............................... 20200100468

(51) Int. Cl.
*H04W 56/00* (2009.01)
(52) U.S. Cl.
CPC ... *H04W 56/0045* (2013.01); *H04W 56/0095* (2013.01)

(58) Field of Classification Search
CPC ...... H04B 1/745; H04B 7/0695; H04B 7/088; H04B 7/08; G16Y 10/40; G16Y 10/60;
(Continued)

(56) References Cited

U.S. PATENT DOCUMENTS

| | | | | |
|---|---|---|---|---|
| 11,399,355 B2 * | 7/2022 | Vos | ........................ | H04W 72/21 |
| 2018/0083745 A1 * | 3/2018 | Sun | ........................ | H04L 5/0048 |

(Continued)

FOREIGN PATENT DOCUMENTS

| | | |
|---|---|---|
| CN | 111132332 A | 5/2020 |
| CN | 111225443 A | 6/2020 |

(Continued)

OTHER PUBLICATIONS

Huawei., et al., "RA and CG Based Small Data Transmission", 3GPP TSG RAN WG1 Meeting #104bis-e R1-2102312, E-meeting, Apr. 12-20, 2021, 7 Pages.
(Continued)

*Primary Examiner* — Nathan S Taylor
(74) *Attorney, Agent, or Firm* — Loza & Loza, LLP

(57) ABSTRACT

Technologies and techniques are disclosed for managing timing advance (TA) validation of configured grant small data transmission (CG-SDT). A scheduling entity may receive downlink signal quality measurements for downlink beams from a scheduled entity, as well as a CG-SDT configuration request. The scheduling entity may transmit a CG-SDT configuration to the UE in response to receiving the CG-SDT configuration request, where the CG-SDT configuration includes a timing advance (TA) validation criteria based on downlink signal quality measurements meeting configured thresholds.

22 Claims, 15 Drawing Sheets

(58) Field of Classification Search
CPC ... G16Y 10/80; H04J 11/0069; H04J 11/0073; H04J 11/0076; H04W 72/23; H04W 76/27; H04W 72/1268; H04W 72/21; H04W 56/0045; H04W 76/30; H04W 24/10; H04W 56/001; H04W 72/04; H04W 72/0446; H04W 72/0453; H04W 72/53; H04W 74/0833; H04W 76/19; H04W 16/28; H04W 24/08; H04W 52/0216; H04W 52/0229; H04W 52/0241; H04W 56/0055; H04W 72/046; H04W 72/115; H04W 72/1263; H04W 72/54; H04W 72/542; H04W 74/006; H04W 74/04; H04W 74/0836; H04W 74/0838; H04W 74/0841; H04W 76/11; H04W 76/34; H04W 72/12; H04W 56/00; H04W 74/08; H04W 74/00; H04L 1/18; H04L 5/00

See application file for complete search history.

(56) References Cited

U.S. PATENT DOCUMENTS

| | | | | |
|---|---|---|---|---|
| 2020/0170069 | A1* | 5/2020 | Shih | H04W 76/27 |
| 2020/0260397 | A1* | 8/2020 | Vos | H04L 5/003 |
| 2021/0112559 | A1* | 4/2021 | Ou | H04W 72/21 |
| 2021/0274526 | A1* | 9/2021 | Shin | H04L 1/1896 |
| 2021/0410180 | A1* | 12/2021 | Tsai | H04L 1/1819 |
| 2022/0007391 | A1* | 1/2022 | Höglund | H04W 72/21 |
| 2022/0022276 | A1* | 1/2022 | Shih | H04W 72/0453 |
| 2022/0045736 | A1* | 2/2022 | Hu | H04L 1/1896 |
| 2023/0180223 | A1* | 6/2023 | Tseng | H04W 56/001 |
| | | | | 370/329 |
| 2023/0262688 | A1* | 8/2023 | Kiilerich Pratas | |
| | | | | H04W 72/1268 |
| | | | | 370/329 |

FOREIGN PATENT DOCUMENTS

| | | |
|---|---|---|
| WO | 2020032629 A1 | 2/2020 |
| WO | 2020032634 A2 | 2/2020 |
| WO | 2020034571 A1 | 2/2020 |
| WO | 2020065619 A1 | 4/2020 |
| WO | 2020222180 A1 | 11/2020 |

OTHER PUBLICATIONS

ZTE., et al., "Discussion on the Physical Layer Aspects of Small Data Transmission", 3GPP TSG RAN WG1 #104b-e, R1-2103494 e-Meeting, Apr. 12-Apr. 20, 2021, pp. 1-4.

Intel Corporation: "Miscellaneous Corrections to Rel-16 eMTC Enhancements", 3GPP TSG-WG2 Meeting #110-e, 3GPP Draft, R2-2004658, 3rd Generation Partnership Project (3GPP), Mobile Competence Centre, 650, Route Des Lucioles, F-06921 Sophia-Antipolis Cedex, France, No. E-Meeting, Jun. 1, 2020-Jun. 12, 2020, 6 Pages, May 22, 2020 (May 22, 2020), XP051888301, Section 7.3d.1, Section 7.3d.2, figure 7.3d-1.

International Search Report and Written Opinion—PCT/US2021/045222—ISA/EPO—Dec. 3, 2021.

Zte Corporation, et al., "Remaining Issues for UL Aspects of D-PUR in IDLE", 3GPP Draft, R2-1905642 Remaining Issues for UL Aspects of D-PUR in IDLE, 3rd Generation Partnership Project (3GPP), Mobile Competence Centre, 650, Route Des Lucioles, F-06921 Sophia-Antipolis Cedex, France, vol. RAN WG2, No. Reno, Nevada, USA, May 13, 2019-May 17, 2019, May 2, 2019 (May 2, 2019), XP051710000, 7 Pages, section 2.2-section 2.3, figures 1 (a), (b).

Intel Corporation: "Miscellaneous Corrections to Rel-16 eMTC Enhancements", 3GPP TSG-WG2 Meeting #110-e, R2-2004658, E-Meeting, Jun. 1, 2020-Jun. 12, 2020, May 22, 2020, 6 Pages.

* cited by examiner

800

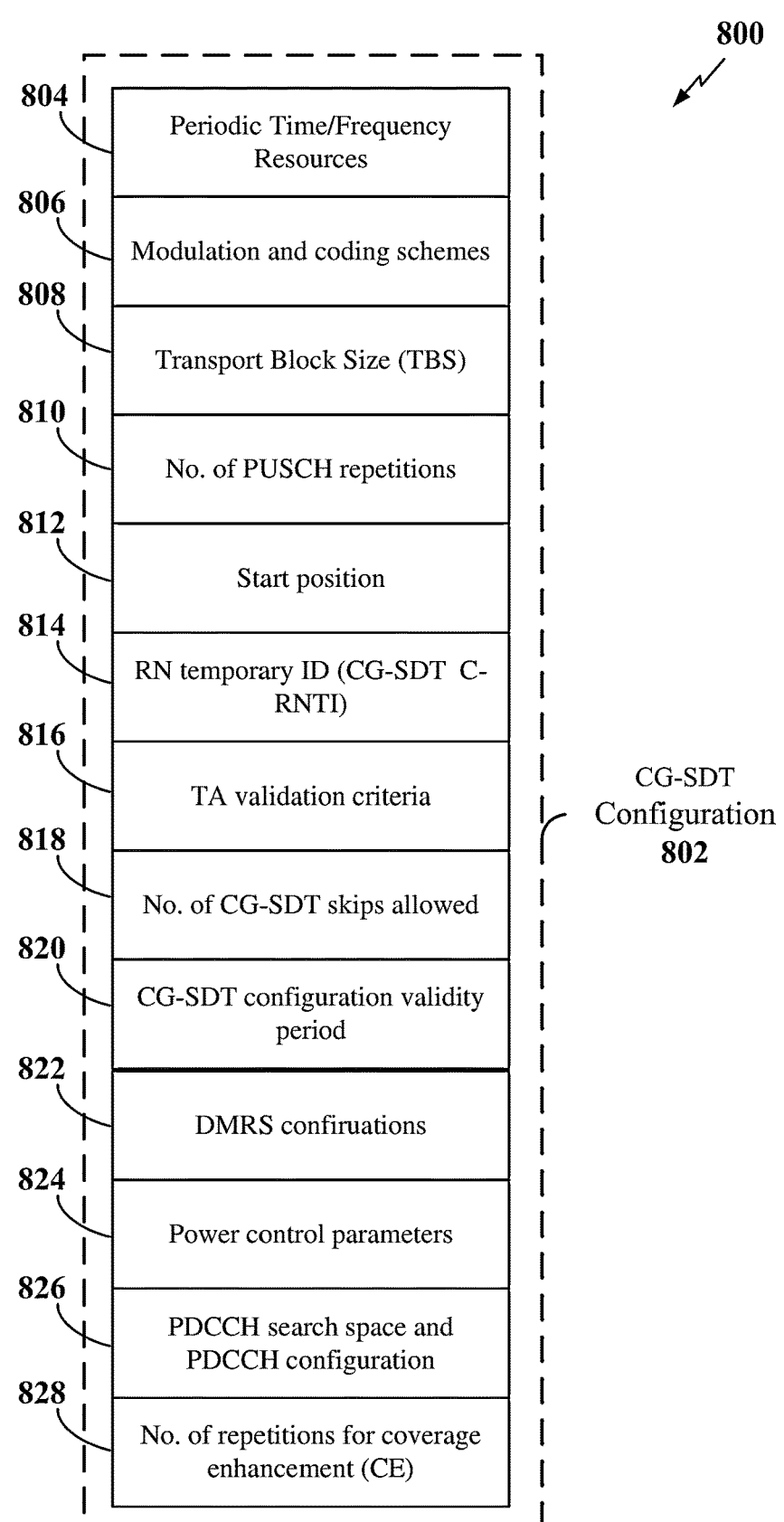

804 — Periodic Time/Frequency Resources

806 — Modulation and coding schemes

808 — Transport Block Size (TBS)

810 — No. of PUSCH repetitions

812 — Start position

814 — RN temporary ID (CG-SDT C-RNTI)

816 — TA validation criteria

818 — No. of CG-SDT skips allowed

820 — CG-SDT configuration validity period

822 — DMRS confiruations

824 — Power control parameters

826 — PDCCH search space and PDCCH configuration

828 — No. of repetitions for coverage enhancement (CE)

CG-SDT Configuration 802

FIG. 8

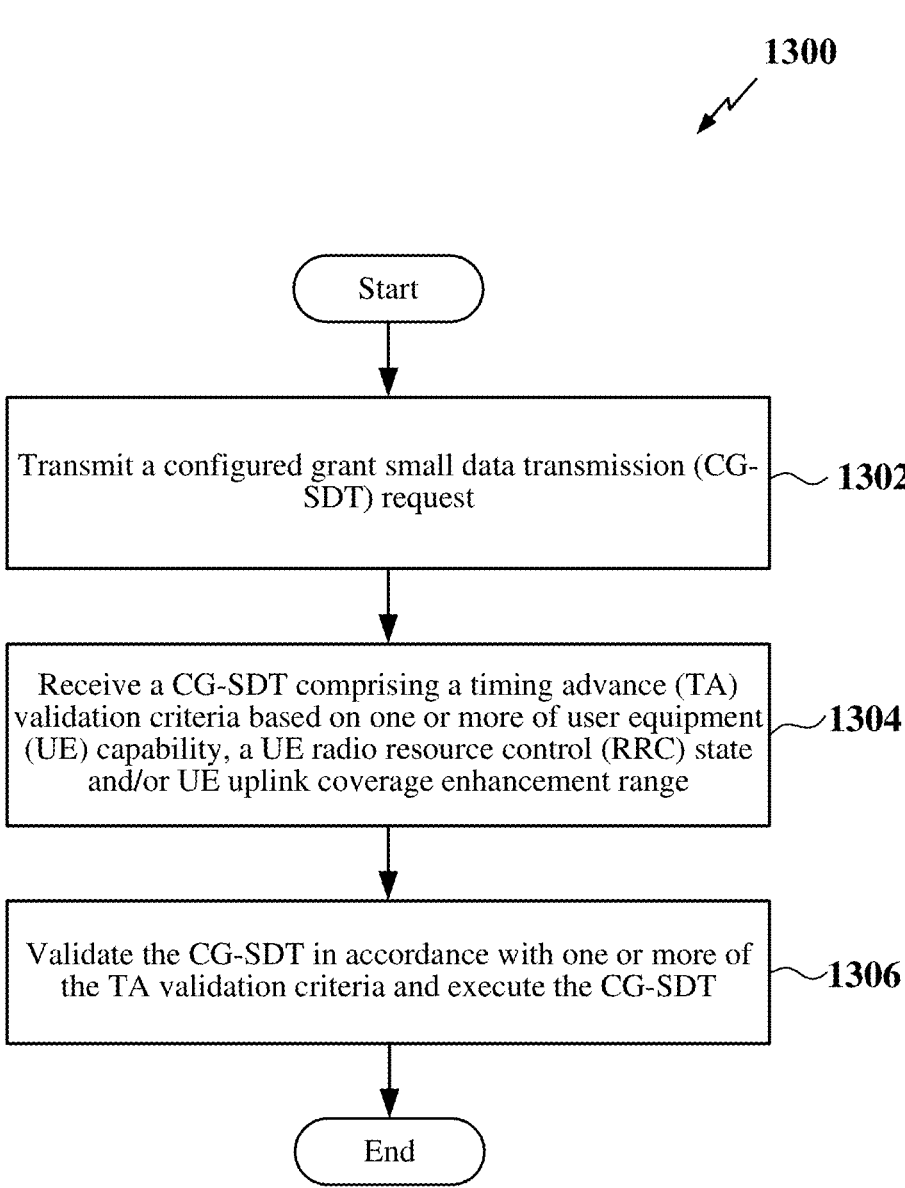

1300

Start

Transmit a configured grant small data transmission (CG-SDT) request ~ 1302

Receive a CG-SDT comprising a timing advance (TA) validation criteria based on one or more of user equipment (UE) capability, a UE radio resource control (RRC) state and/or UE uplink coverage enhancement range ~1304

Validate the CG-SDT in accordance with one or more of the TA validation criteria and execute the CG-SDT ~1306

End

TIMING ADVANCE VALIDATION ENHANCEMENTS FOR PRE-CONFIGURED UPLINK RESOURCES

CROSS-REFERENCE TO RELATED APPLICATIONS

This application is the U.S. national stage of PCT patent application number PCT/US2021/045222 filed on Aug. 9, 2021, which claims priority to Greek patent application Ser. No. 20/200,100468 to Lei, et al., filed Aug. 10, 2020, the contents of which is incorporated by reference in its entirety herein.

TECHNICAL FIELD

The technology discussed below relates generally to wireless communication networks, and more particularly, to techniques for enhancing timing advance (TA) validation for pre-configured uplink resources (PUR) and configured grant small data transmission (CG-SDT) procedures.

INTRODUCTION

Technologies relating to the Internet of Things (IoT) have become more widely used in recent years. The 3rd Generation Partnership Project (3GPP) has specified three cellular solutions for operation in licensed spectrum such as Long Term Evolution (LTE) for machine-type communications (LTE-M), narrowband IoT (NB-IoT), and extended-coverage GSM for IoT (EC-GSM-IoT). Unlike short-range technologies and low-power wide-area (LPWA) technologies operating in unlicensed spectrum, these 3GPP solutions operate in licensed spectrum and can provide a guaranteed quality of service (QoS). Applications include, for example, sensors, surveillance cameras, wearable devices, smart meters and smart meter sensors.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a scheduling entity is disclosed within a wireless communication network, including a transceiver; a memory; and a processor communicatively coupled to the transceiver and the memory, wherein the processor and the memory are configured to: receive a configured grant small data transmission (CG-SDT) configuration request from a user equipment (UE); and transmit a CG-SDT configuration to the UE in response to receiving the CG-SDT configuration request, the CG-SDT configuration comprising a timing advance (TA) validation criteria based on downlink signal quality measurements meeting configured thresholds.

In one example, a method is disclosed of wireless communication of a scheduling entity in a wireless communication network, the method including receiving a configured grant small data transmission (CG-SDT) configuration request from a user equipment (UE); and transmitting a CG-SDT configuration comprising the TA validation criteria to the UE in response to receiving the CG-SDT configuration request, the CG-SDT configuration comprising a timing advance (TA) validation criteria based on downlink signal quality measurements meeting configured thresholds.

In one example, a user equipment (UE) is disclosed within a wireless communication network, including a transceiver; a memory; and a processor communicatively coupled to the transceiver and the memory, wherein the processor and the memory are configured to: transmit signal quality measurements of configured downlink beams; transmit a configured grant small data transmission (CG-SDT) request; receive a CG-SDT configuration comprising a timing advance (TA) validation criterion based on the signal quality measurements meeting configured thresholds; validate the TA for CG-SDT transmission in accordance with one or more of the TA validation criteria; and execute the CG-SDT configuration for communication with the wireless network.

In one example, a method is disclosed of wireless communication of a user equipment (UE) in a wireless communication network, the method including transmitting signal quality measurements of configured downlink beams; transmitting a configured grant small data transmission (CG-SDT) request; receiving a CG-SDT configuration comprising a timing advance (TA) validation criterion based on the signal quality measurements meeting configured thresholds; validating the TA for CG-SDT configuration transmission in accordance with one or more of the TA validation criteria; and executing the CG-SDT configuration for communication with the wireless network.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8 illustrates a signal block diagram of a CG-SDT configuration 802 according to some aspects;

FIG. 13 is a flow chart illustrating an exemplary process for a UE implementing a CG-SDT procedure with enhanced TA validation according to some aspects;

DETAILED DESCRIPTION

Figure 1:
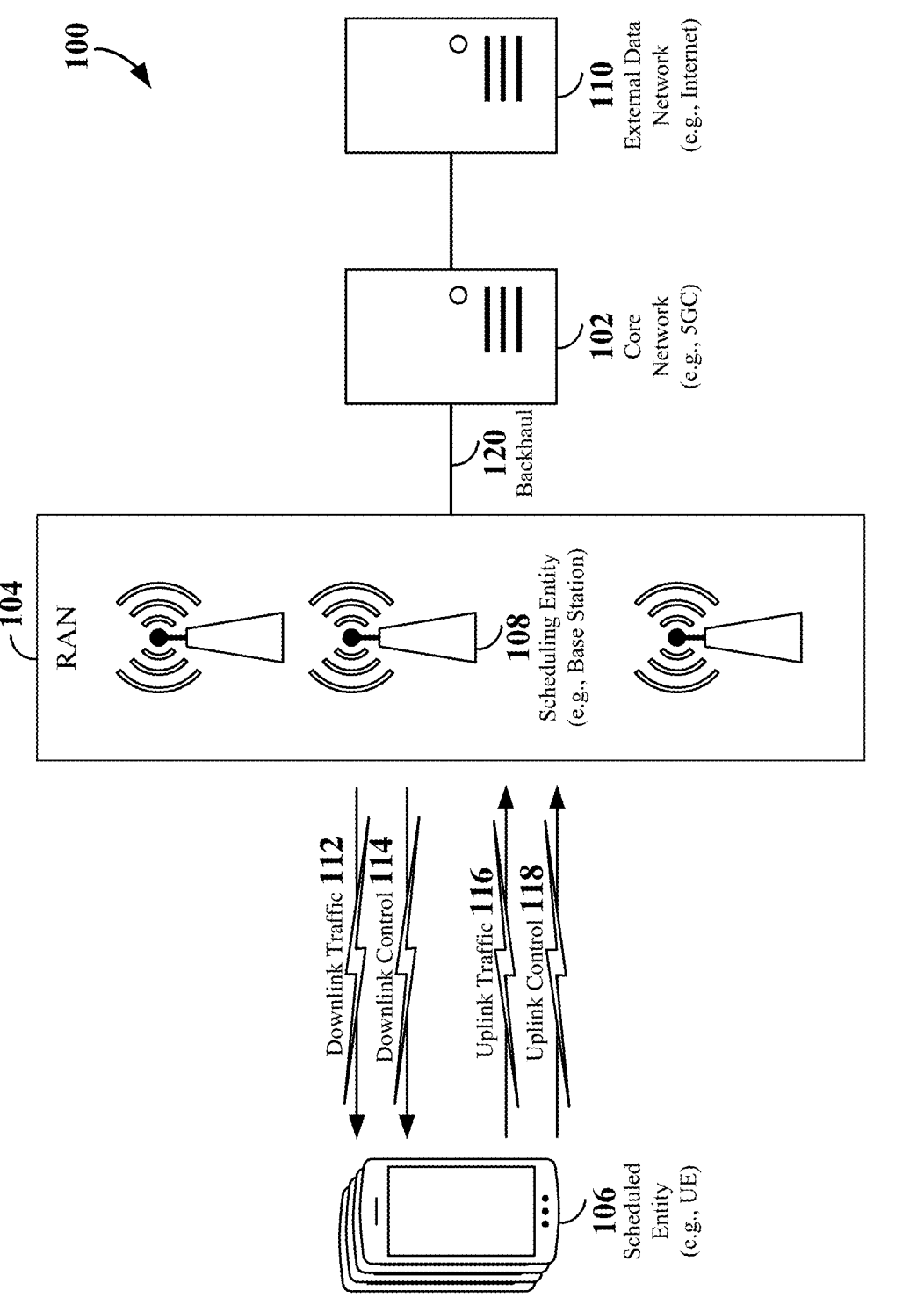
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

An aspect of IoT technology is that signaling overhead for the IoT wireless device or user equipment (UE) should be minimized to reduce energy consumption, especially for small data transmissions. Currently, configured grant small data transmissions (CG-SDTs) (also referred to as PUR) are limited in their ability to provide timing advance (TA) validation criterion to IoT device based on specific configurations, which results in inefficient device operation. For example, current CG-SDT systems are limited or unable to customize CG-SDT transmissions to accommodate IoT device characteristics, such as downlink signal quality measurements, downlink signal quality measurement configurations, downlink reference signals, respective beam indexes of downlink reference signals, positioning information obtained from a serving cell or one or more neighbor cells, respective transmit power offsets of each of the downlink reference signals, or thresholds for received power (RSRP) measurements or a variation in RSRP measurements. Alternately or in addition, current CG-SDT systems are limited or unable to customize CG-SDT transmissions to accommodate aspects such as device capability, device radio resource control (RRC) states, device uplink coverage enhancement for a CG-SDT transmission, a detected change of a serving cell or transmission and reception point (TRP), a TA timer configuration, and positioning information.

Technologies and techniques are disclosed for managing timing advance (TA) validation of configured grant small data transmission (CG-SDT). TA validation criteria are based on enhanced features including user equipment (UE) capability, a UE radio resource control (RRC) state, DL beam configuration for one or multiple reference signals, positioning information, coverage enhancement and UE power saving considerations (joint configuration of measurement gap with WUS occasion, paging occasion and DRX-on time period of UE). During a CG-SDT procedure, the CG-SDT configuration is configured with the enhanced TA validation criteria to allow for customized or common configuration for UEs, and the TA validation configuration can be jointly optimized with UE's wake-up signaling, paging and positioning signaling. Other aspects, features, and embodiments are also claimed and described.

Various aspects of the disclosure relate to processing CG-SDTs in a wireless network, where timing advance (TA) validation criterion may be generated based on signal quality information, such as signal quality measurements meeting configured thresholds and/or configurations of configured downlink beams. A CG-SDT configuration request may be transmitted from a user equipment (UE) to a base station, where the base station transmits to the UE a CG-SDT configuration including the TA validation criteria in response to receiving the CG-SDT configuration request. The UE may then validate and execute the received CG-SDT configuration for small data operation.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station includes two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic

116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that is time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
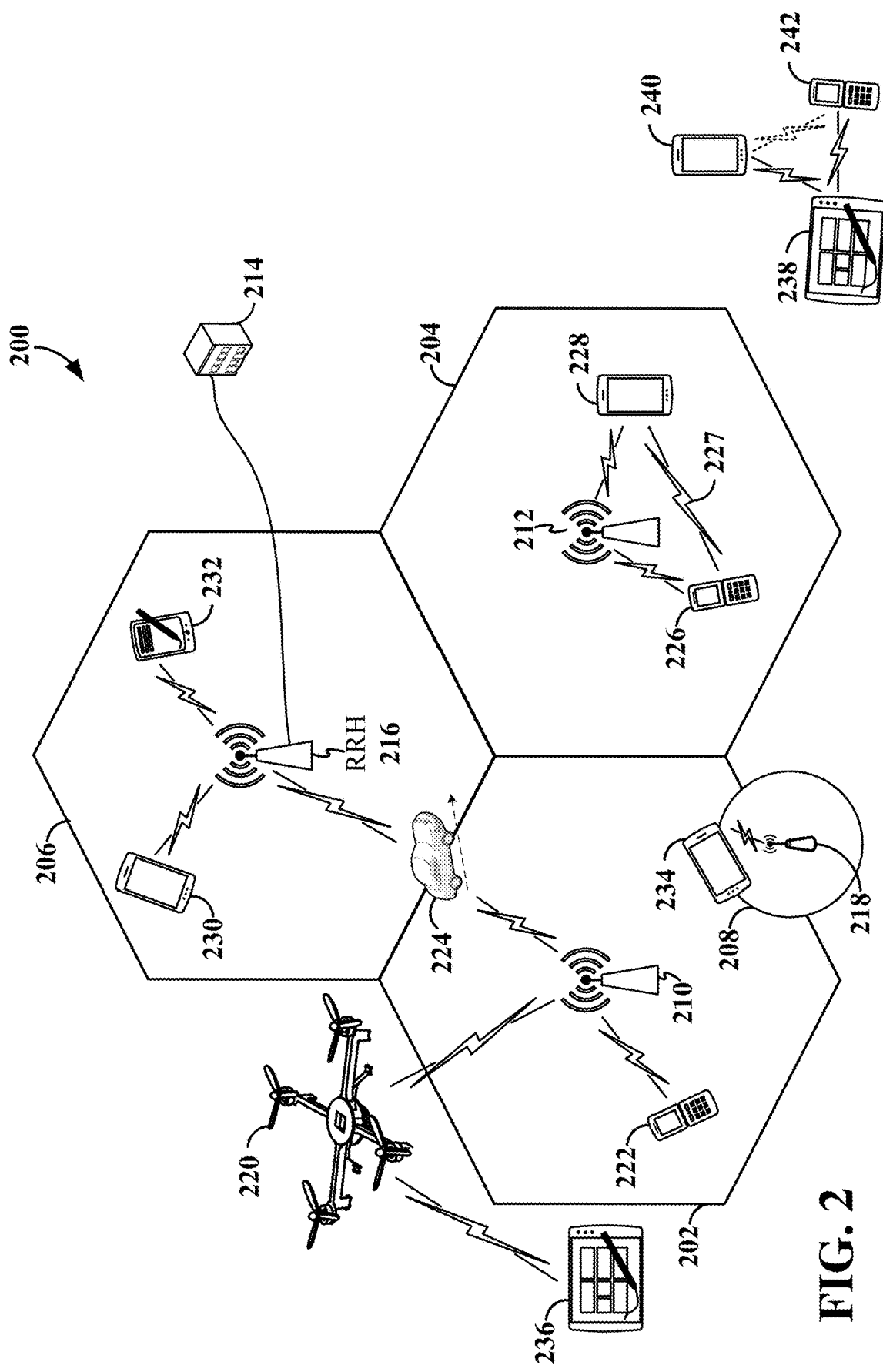
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 is divided into a number of cellular regions (cells) that can be uniquely identified by a user equipment (UE) based on an identification broadcasted over a geographical area from one access point or base station. FIG. 2 illustrates cells 202, 204, 206, and 208, each of which include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 includes any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station (220). In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF includes a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex or TDD FD.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
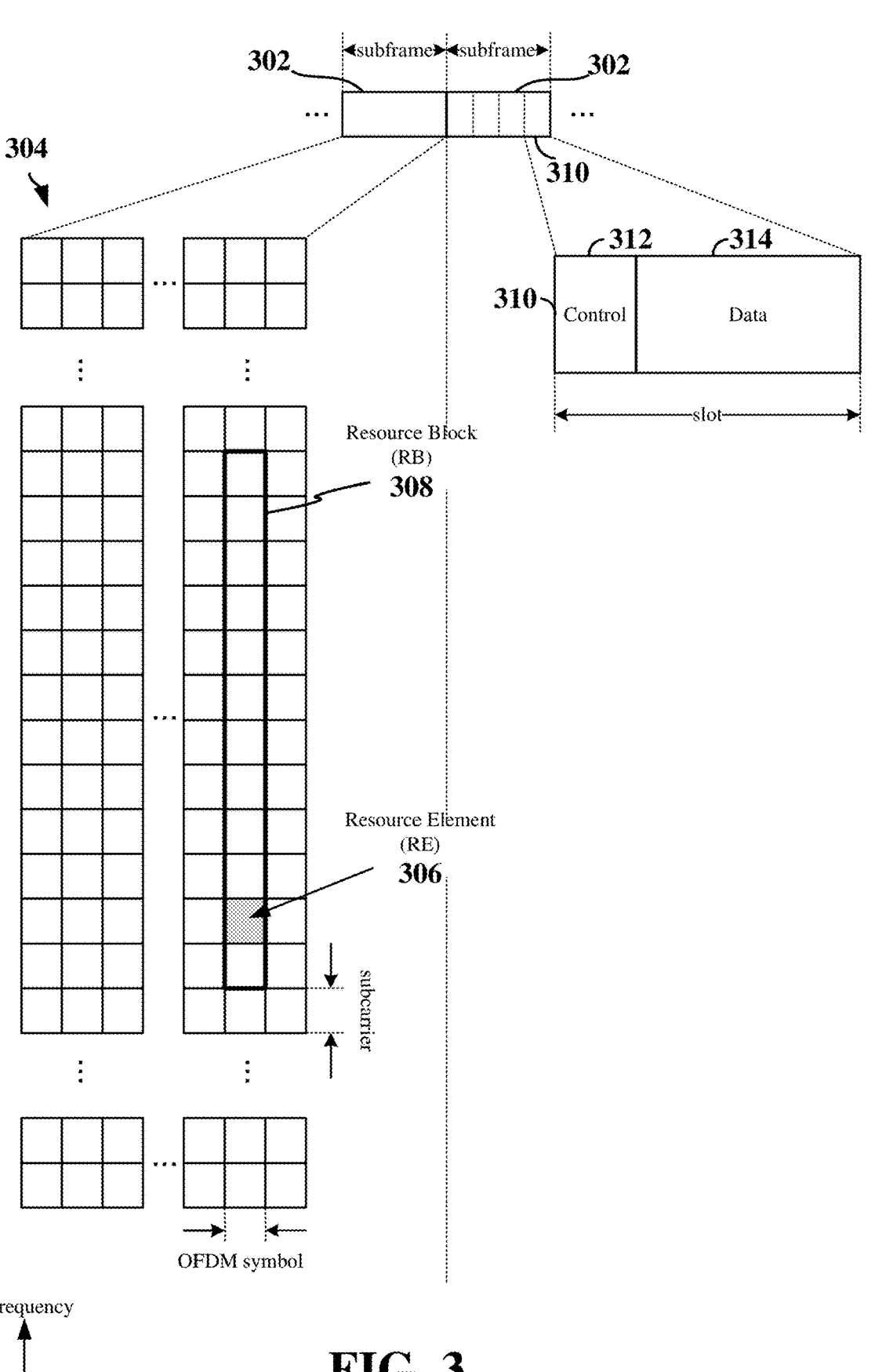
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE represents one or more bits of information. In some examples, a block of REs may be referred to as a physical resource block (PRB) or more simply a resource block (RB) 308, which contains any suitable number of consecutive subcarriers in the frequency domain. In one example, an RB includes 12 subcarriers, a number independent of the numerology used. In some examples, depending on the numerology, an RB includes any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 has a bandwidth corresponding to any number of one or more RBs 308. Further, in this illustration, the RB 308 is shown as occupying less than the entire duration of the subframe 302, although this is merely one possible example.

Each 1 ms subframe 302 includes one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot includes 7 or 14 OFDM symbols with a nominal CP. Additional examples include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that include various additional system information. The MIB and SIB 1 together provide the minimum system information (SI) for initial access. Examples of system information transmitted in the MIB include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB 1. Examples of remaining minimum system information (RMSI) transmitted in the SIB 1 include, but are not limited to, a random-access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI includes a variety of packet types and categories, including pilots, reference signals, and information configured to enable or assist in decoding uplink data transmissions. Examples of uplink reference signals include a sounding reference signal (SRS) and an uplink DMRS. In some examples, the UCI includes a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 includes a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 includes a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
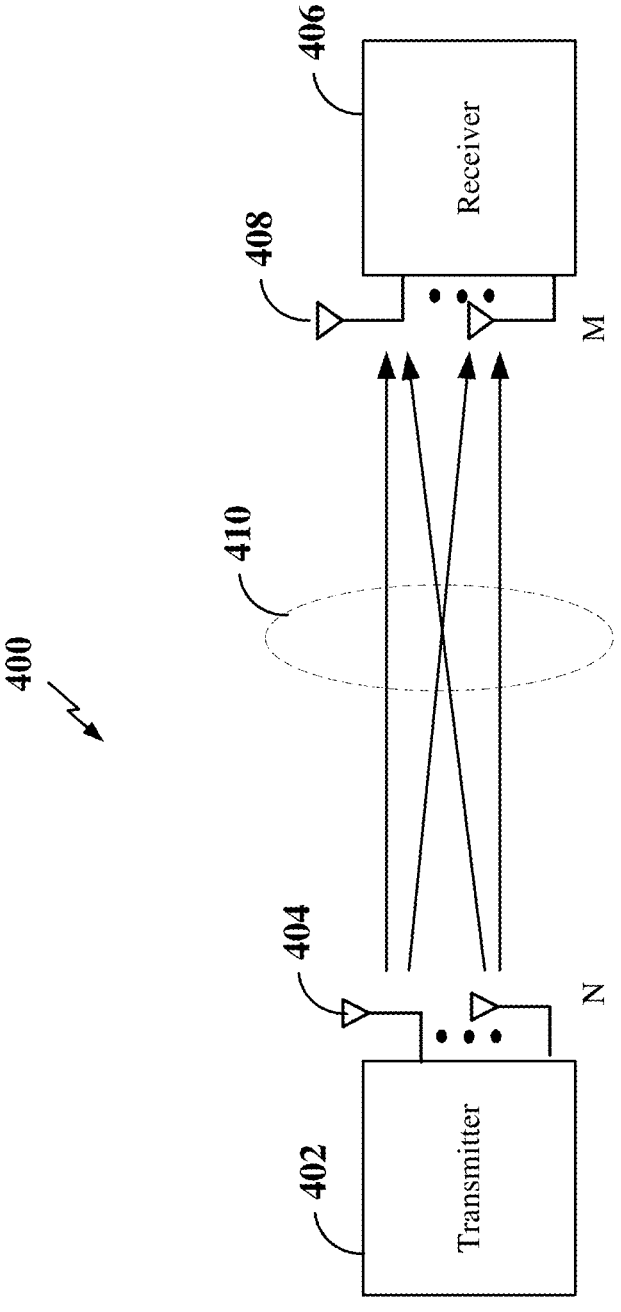
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In some examples, to select a particular beam for communication with a UE, the base station may transmit a reference signal, such as an SSB or channel state information reference signal (CSI-RS), on each of a plurality of beams (SSB beams) in a beam-sweeping manner. The UE may measure the reference signal received power (RSRP), reference signal received quality (RSRQ) or SINR on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS),In order to gain access to a cell, a UE may perform a random-access procedure over a physical random-access channel (PRACH). The UE may identify a random-access search space including PRACH resources for initiating a RACH procedure from the SIB 1. For example, a random-access process may be commenced after a UE acquires a cell and determines occurrence of a RACH occasion (e.g., PRACH resources) after reading SSB and a SIB 1. The SSB provides the initial system information (SI), and the SIB1 (and other SIB blocks) provide the remaining minimum SI (RMSI). For example, the PBCH MIB of the SSB may carry a first part of the SI that a user equipment (UE) needs in order to access a network. The SIBs (e.g., SIB1 and SIB2) can carry the RMSI that a UE needs to gain access to the network.

RACH procedures may be performed in various scenarios, such as loss of uplink synchronization, lack of available PUCCH resources, scheduling request failure, and other use cases. In addition, a RACH procedure may be contention-based or contention-free and includes a 2-step RACH process (contention-based or contention-free), a 3-step RACH process (contention-free), or a 4-step RACH process (contention-based).

The radio protocol architecture for a radio access network, such as the radio access network 104 shown in FIG. 1 and/or the radio access network 200 shown in FIG. 2, may take on various forms depending on the particular application. An example of a radio protocol architecture for the user and control planes is illustrated FIG. 5.

Figure 5:
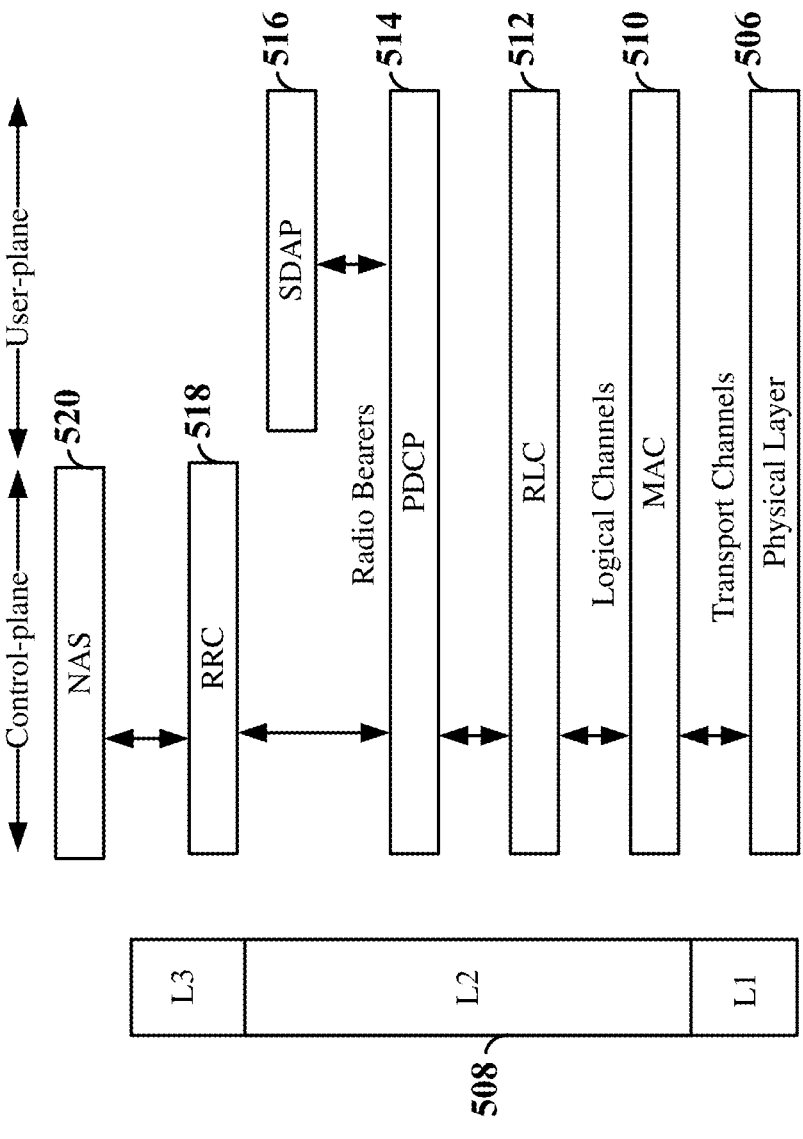
FIG. 5 is a block diagram illustrating a radio protocol architecture for the user and control planes according to some aspects.

As illustrated in FIG. 5, the radio protocol architecture for the UE and the base station includes three layers: layer 1 (L1), layer 2 (L2), and layer 3 (L3). L1 is the lowest layer and implements various physical layer signal processing functions. L1 will be referred to herein as the physical layer 506. L2 508 is above the physical layer 506 and is responsible for the link between the UE and base station over the physical layer 506.

In the user plane, the L2 layer 508 includes a media access control (MAC) layer 510, a radio link control (RLC) layer 512, a packet data convergence protocol (PDCP) 514 layer, and a service data adaptation protocol (SDAP) layer 516, which are terminated at the base station on the network side. Although not shown, the UE may have several upper layers above the L2 layer 508 including at least one network layer (e.g., IP layer and user data protocol (UDP) layer) that is terminated at the User Plane Function (UPF) on the network side and one or more application layers.

The SDAP layer 516 provides a mapping between a 5G core (5GC) quality of service (QoS) flow and a data radio bearer and performs QoS flow ID marking in both downlink and uplink packets. The PDCP layer 514 provides packet sequence numbering, in-order delivery of packets, retransmission of PDCP protocol data units (PDUs), and transfer of upper layer data packets to lower layers. PDU's include, for example, Internet Protocol (IP) packets, Ethernet frames and other unstructured data (i.e., Machine-Type Communication (MTC), hereinafter collectively referred to as "packets"). The PDCP layer 514 also provides header compression for upper layer data packets to reduce radio transmission overhead, security by ciphering the data packets, and integrity protection of data packets. A PDCP context may indicate whether PDCP duplication is utilized for a unicast connection.

The RLC layer 512 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 512. The MAC layer 510 provides multiplexing between logical and transport channels. The MAC layer 510 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 506 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 506 and L2 508 with the exception that there is no SDAP layer in the control plane and there is no header compression function for the control plane. The control plane also includes a radio resource control (RRC) layer 518 in L3 and a higher Non Access Stratum (NAS) layer 520. The RRC layer 518 is responsible for establishing and configuring signaling radio bearers (SRB s) and data radio bearers (DRBs) between the base station the UE, paging initiated by the 5GC or NG-RAN, and broadcast of system information related to Access Stratum (AS) and Non Access Stratum (NAS). The RRC layer 518 is further responsible for QoS management, mobility management (e.g., handover, cell selection, inter-RAT mobility), UE measurement and reporting, and security functions. The NAS layer 520 is terminated at the AMF in the core network and performs various functions, such as authentication, registration management, and connection management.

In some examples, scheduled entities (UEs) may be operating in an operating environment that supports reduced-capability NR devices (also known as "NR Light").

NR light devices may be configured with lower device complexity and reduced energy consumption compared what can be provided by traditional NR devices and which, at the same time, have higher requirements in terms of data rates and latency compared to what can be provided with, for example, LTE machine-type communication (MTC) and narrowband internet of things (NB-IoT). In terms of reduced device complexity, NR light devices may be configured with support for reduced number of TX/RX antennas at the device side, reduction of the minimum required device bandwidth and/or support for devices only capable of half-duplex operation (no simultaneous TX/RX) in paired spectrum. In terms of reduced device energy consumption, NR Light devices may be configured with reduced complexity in PDCCH monitoring by reducing the number of required blind decoding, as well as extended discontinuous reception (DRX) functionality. One having ordinary skill in the art will appreciate that the examples in the present disclosure are suited for applications utilizing NR Light, although they may be equally applied in traditional NR configurations as well.

NR Light devices are configured to perform two-step or four-step RACH procedures in an initial bandwidth part (BWP) or active BWP. In some examples, the present disclosure discloses the utilization of early reporting of CSI and/or CQI during RACH procedures to improve performance. More specifically, technologies and techniques are disclosed for reporting CSI measurement for short/small mobile originating (MO) data transfer by a scheduled entity in a RRC IDLE/INACTIVE state or a discontinuous reception (DRX) mode of RRC connected state. In some examples, a scheduled entity may remain in an RRC IDLE/INACTIVE state after finishing the short data (small data) transfer, which saves scheduled entity power and reduces signaling complexity by reducing the signaling overhead. Utilizing link adaptation, for example, based on CSI/CQI reporting, such techniques may improve the coverage, power and spectral efficiency of NR Light devices when transmitting/receiving in the initial BWP or active BWP.

As discussed above, wireless networks typically employ a scheduling mechanism implemented in the MAC layer to dynamically allocate radio resources to the users, considering their QoS requirements. A scheduler takes into account the CSI and a target block error rate (BLER) to allocate the channel resources for transmitting the buffered data. Link adaptation based on adaptive modulation and coding can be employed to improve the spectral efficiency. The scheduler can multiplex the transmissions performing per-user allocation of the available time-frequency resources. Scheduling algorithms ensure efficient use of the channel and fairness for serving the multiple users while meeting their QoS requirement. For 5G NR, scheduling prioritization for traffic may be allocated in short transmission time intervals (TTIs) to enable meeting service requirements. In the downlink, the resource allocation and dynamic link adaptation can be promptly provided by DCI transmitted in the same TTI as the data. The UE may then quickly process the control information with the parameters and decode the data subsequently.

Figure 6:
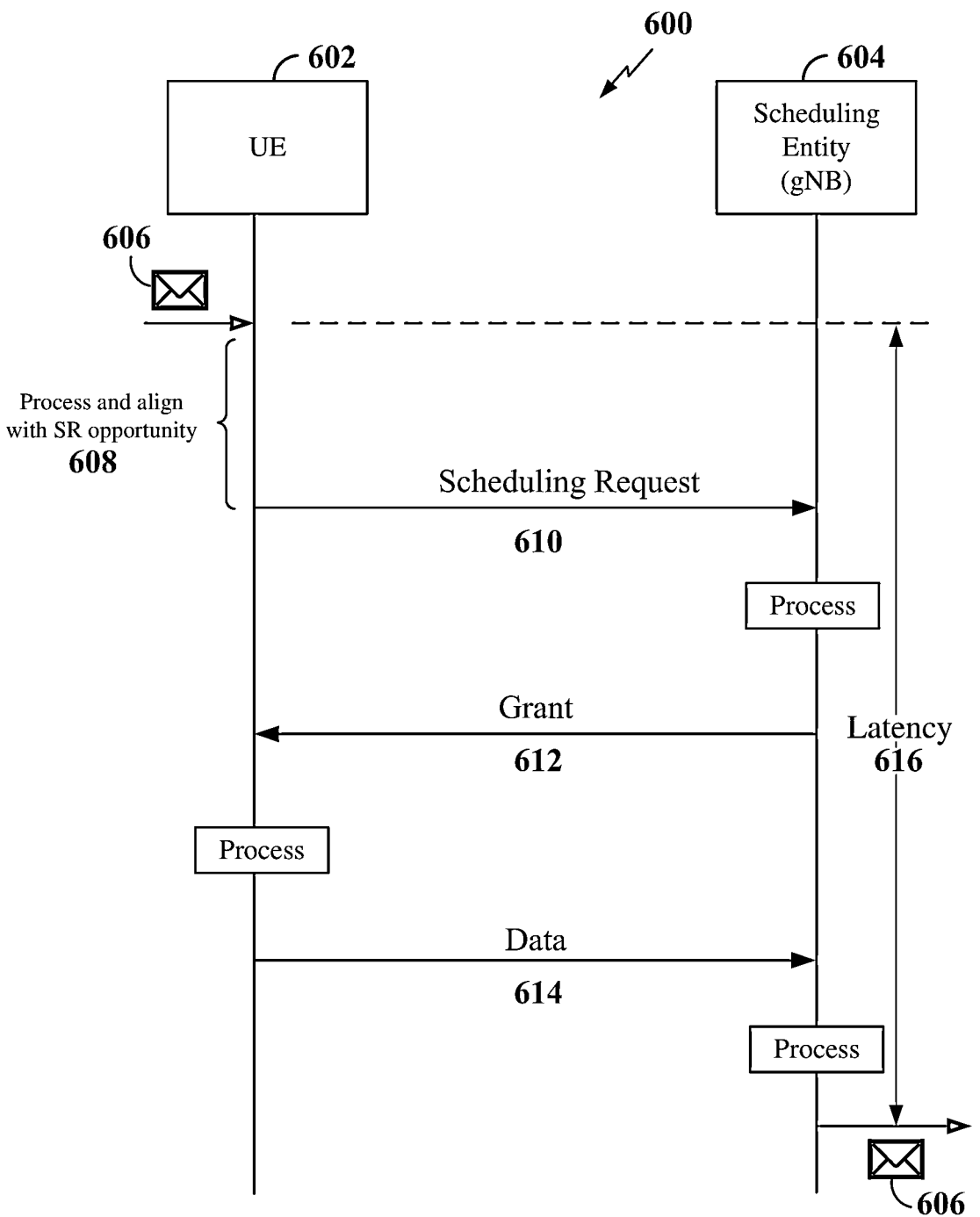
FIG. 6 is a signaling diagram illustrating a grant-based procedure between a UE and a scheduling entity according to some aspects.

In the uplink, however, a grant-based procedure is usually performed, as illustrated in FIG. 6. FIG. 6 is a signaling diagram 600 illustrating a grant-based procedure between a UE 602 and a scheduling entity 604 (e.g., gNB) according to some aspects. When data 606 arrives in the transmission buffer of the UE 602, the UE 602 processes the data and waits for a specific opportunity to transmit a scheduling request (SR) to the base station 608 before transmitting the scheduling request in 610. The scheduling entity 605 processes the SR signal and sends a scheduling grant 612 to the UE 602 through a DCI, containing the necessary allocation and transmission parameters. The UE 602 processes the control signal and, finally, transmits the data 614 using the granted resources to the scheduling entity 604, which processes and receives the data 604. As can be seen in FIG. 6, the latency 616 is shown as the period of time from which the data 604 is received in the UE 602 buffer, to the period of time in which the scheduling entity 604 receives the data 606.

Figure 7:
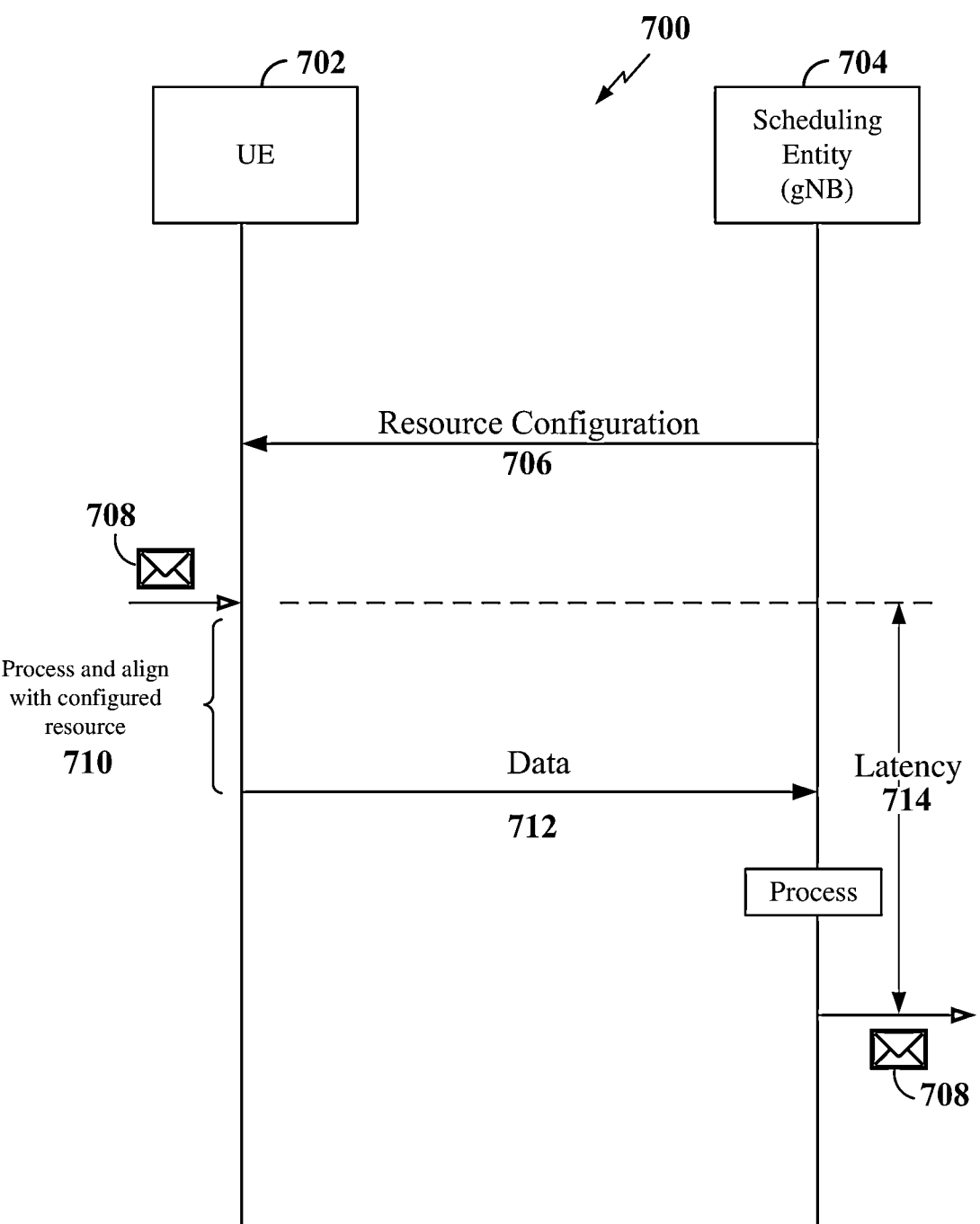
FIG. 7 is a signaling diagram illustrating a grant-free procedure between a UE and a scheduling entity according to some aspects.

FIG. 7 is a signaling diagram 700 illustrating a grant-free procedure between a UE 702 and a scheduling entity 704 (e.g., gNB) according to some aspects. In this case, the scheduling entity is configured to pre-configures the UE 702 with the resource allocation and transmission parameters via resource configuration 706 transmission. When data 708 (e.g., packet) arrives, the UE processes the data and aligns it with the configured resource 710 and transmits the data 712 using the pre-allocated resources, i.e., without needing a dynamic grant from the scheduling entity 704. The scheduling entity 704 then receives and processes the data 708 via the pre-allocated resources. This reduces the control channel overhead and the dependence on the control signaling, which may be prone to errors and cause delays. As can be seen in comparison to FIG. 6, the latency 714 is shorter compared to the grant-based configuration (616).

By preconfiguring the UE 702 with UL radio resources for transmission under the premise that the UE is in possession of a valid timing advance (TA) (or "timing adjustment"), the operating effect of providing configured grant small data transmission (CG-SDT) resources (i.e., PUR) is that the use of Msg1 and Msg2, as well as the need to perform a legacy connection establishment procedure, is not necessary. Instead, in various aspects of the disclosure, the UE 702 may be configured with CG-SDT resources via dedicated RRC signaling while in connected state (e.g., obtaining UE-specific radio resources, a RNTI to be used, etc.). In some examples, a longer TA timer is provided to the UE 702 such that TA can be reused for the subsequent CG-SDT transmissions. As is explained in greater detail below, a UE may transmit signal quality measurements of configured downlink beams, followed by a CG-SDT request, where a CG-SDT configuration (e.g., via 706) is received in response thereto. The CG-SDT configuration may include comprising a TA validation criterion based on the signal quality measurements meeting configured thresholds. The UE validates the TA for CG-SDT transmission in accordance with one or more of the TA validation criteria, and executes the CG-SDT configuration for communication (e.g., via 712) with the wireless network. It should be understood by those skilled in the art that the terms pre-configured uplink resources (PUR) and configured grant small data transmission (CG-SDT) resources as used herein should be interpreted as being synonymous.

FIG. 8 illustrates a signal block diagram 800 of a CG-SDT resource configuration 802 according to some aspects. The CG-SDT resource configuration 802 includes one or more of periodic time-frequency resources 804, a modulation and coding scheme (MCS) 806, a transport block size (TBS) 808, a number of PUSCH repetitions 810, a start position 812, a radio network temporary identifier (e.g., CG-SDT C-RNTI) 814, a TA validation criteria 816, a number of CG-SDT resource skips allowed 818, whether the CG-SDT resource configuration is valid for one or more number of occasions 820, a demodulation reference signal (DMRS) configuration 822, power control parameters 824, a PDCCH search space and PDCCH configuration 826, and a number of repetitions for coverage enhancement (CE). Additional data may further be included in the CG-SDT resource configuration 802, depending on the application.

The CG-SDT resource configuration 802 may be triggered either by the UE (e.g., 702) sending a CG-SDT resource Configuration Request message to a scheduling entity when in RRC connected state or by the network (e.g., based on subscription information and/or identification of a periodic traffic pattern). Before performing a CG-SDT resource transmission, the UE evaluates the validity of the TA (816) based on either individual or combined usage of a number of attributes, including whether the serving cell has changed, whether a TA timer that is part of the CG-SDT resource configuration has expired, and/or whether the reference signal received power (RSRP) has changed more than a configured threshold since the time of configuration. In some examples, it is possible to configure the TA as always valid within a given cell, which may be suitable for small cell applications. If TA validation fails, the UE may instead use early data transmission (EDT), if supported, or a conventional connection establishment procedure (e.g., 600).

In the case when TA validation (816) passes, a CG-SDT transmission is successfully acknowledged by the scheduling entity, and the CG-SDT procedure is concluded after two messages (i.e., one in UL and one in DL). The acknowledgment can be provided via either layer-1 signaling in downlink control information (DCI) or layer-2/3 signaling in an RRC message. In some examples, hybrid automatic repeat request (HARD) may be used for the acknowledgement of the CG-SDT transmission, and, after a configured period of time (e.g., 4 ms) after the CG-SDT transmission ends, the UE may monitor the PDCCH for a DCI scrambled by the CG-SDT C-RNTI including the acknowledgment or a possible retransmission request in a PDCCH search space window of configurable length (826).

The configurable periodicity of CG-SDT resources (820) makes it suitable for periodic traffic. However, CG-SDT may also be configured (e.g., via 818) so that the UE may skip transmitting a certain number of CG-SDT occasions in a row (e.g., up to eight skips), after which the CG-SDT configuration may be implicitly released. In addition, a shared CG-SDT scheme may be used to address applications where traffic is less consistent. For example, a UE may be configured to transmit using CG-SDT resources irregularly in a pseudo-varying manner.

In some examples, the successful reception of an UL CG-SDT transmission may be indicated with a layer-1 acknowledgement. If there is no pending downlink data, the CG-SDT configuration may not need to be updated, and integrity protection may not be required. UE's are configured to support integrity protection and replay protection of user data between the UE and the network nodes. Integrity protection is a part of tamper-proofing, which is when steps are taken to ensure a program runs properly, especially when entities try to disrupt, monitor, or change how it runs. The acknowledgment via layer-1 signaling may be configured to allow TA adjustment, along with the number of PUSCH repetitions, as well as an indication to instead use early data transmission (EDT) or a conventional connection establishment procedure (e.g., 600). In other cases, the response to transmission in the UL using CG-SDT can be provided via layer-2/3 signaling (e.g., an RRC message) not only for acknowledgment but also to transmit user data in the downlink, modify the CG-SDT configuration, and/or move the UE to connected state, if needed.

Power control parameters 824 for CG-SDT may be configured differently, depending on the operating environment (e.g., LTE-M, NB-IoT, etc.). For example, for LTE-M, CG-SDT transmissions may use open-loop power control since the periodicity range considered for CG-SDT may not be suitable for using transmit power control (TPC) commands, whereas CG-SDT retransmissions may make use of closed-loop power control since they may be expected to be completed in the short term through dynamic retransmission scheduling. For NB-IoT, open-loop power control may be used, and the transmit power of the UE accounts for the path loss estimate regardless of the number of repetitions.

CG-SDT transmissions may be configured as dedicated CG-SDT or shared CG-SDT. In dedicated CG-SDT, UL time-frequency resources may be used for exclusive use by one UE at a time. Dedicated CG-SDT may be suitable for UEs transmitting periodically in the UL (e.g., sensors and meters) and can be used at any signal-to interference-plus-noise ratio (SINR) regime (e.g., both CE mode A and B for LTE-M). In shared CG-SDT, the same UL time-frequency resources can be used simultaneously by a plurality of UEs. The overlapping transmissions can be distinguished using orthogonal DMRS sequences. This UL multi-user multiple-input multiple-output (MU-MIMO) configuration may be used for both periodic and pseudo-varying traffic patterns.

During operation, the scheduling entity may transmit a CG-SDT configuration message to a UE, whereupon receiving the CG-SDT configuration message, the UE transmits the CG-SDT data to scheduling entity. In some examples, the scheduling entity may transmit the CG-SDT configuration message periodically. In other examples, the scheduling entity does not transmit the CG-SDT configuration message periodically, but the CG-SDT configuration message may be configured to instruct the UE to transmit data on the CG-SDT periodically. The TA validation is performed by UE, based on the TA validation criteria configured by scheduling entity. To perform TA validation, the UE measures DL channels or reference signals, as indicated in the TA validation criteria. In some examples, if the TA validation is successful, the UE can transmit UL data on CG-SDT, if the time gap between the DL channels/signals used for TA validation and the CG-SDT (UL data transmission) is less than a specified threshold. Upon receiving the UE's CG-SDT data, the scheduling entity may respond with a CG-SDT response message.

Figure 9:
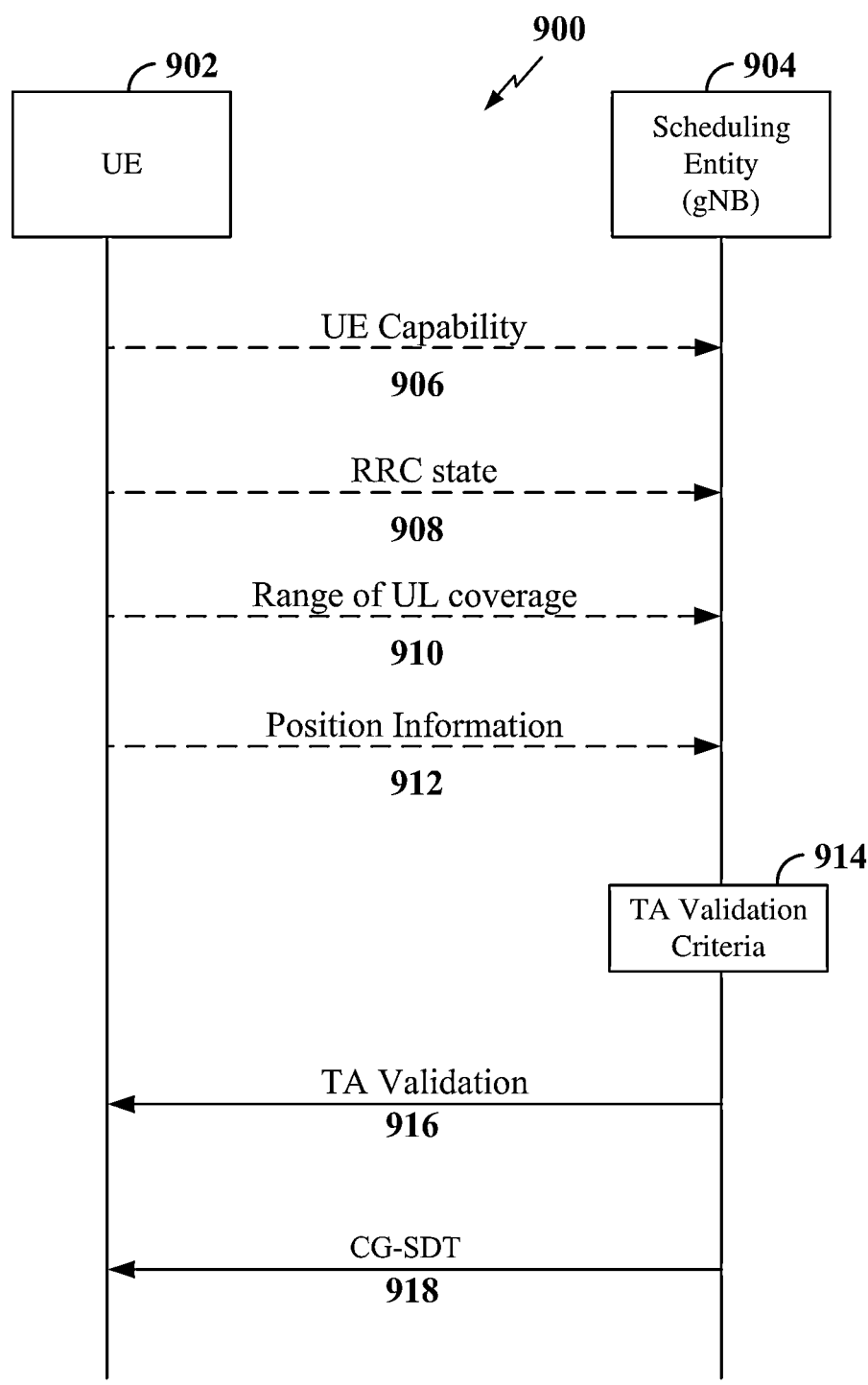
FIG. 9 shows a signaling diagram for a UE and scheduling entity utilizing enhanced TA for a CG-SDT procedure according to some aspects.

In some examples, TA validation criteria (816) may be enhanced to provide greater control and flexibility during a CG-SDT procedure. FIG. 9 shows a signaling diagram 900 for a UE 902 and scheduling entity 904 (e.g., gNB) utilizing enhanced TA for a CG-SDT procedure according to some aspects. In this example, the scheduling entity 904 may receive data associated with one or more of a UE capability 906, an RRC state 908, a range of UL coverage 910 and UE position information 912. This data may be received from the UE 902 during a previous connection (shown in the dotted line), but may also, alternately or in addition, be received from other sources and stored in the scheduling entity memory.

The UE capability data 902 includes data associated with a UEs subscription information, that includes, for example, communication and/or processing capabilities (e.g., low-category UE, normal UE, premium UE). The RRC state data 908 indicates a UE state (e.g., active, idle connected). The range of UL coverage data 910 includes data indicating a UE's presence in a configured UL range in which a CG-SDT operation may be performed. In one example, the range of UL coverage data 910 may be determined by a number of PUSCH repetitions R, where the number of repetition levels are between a $R_{min}$ and $R_{max}$, where $R_{min}$ and $R_{max}$ may be determined by the network. In another example, the range of UL coverage data 910 may be determined by a number of aggregated PUSCH slots S where the number of aggregated slots are between a $S_{min}$ and $S_{max}$, where $S_{min}$ and $S_{max}$ may be determined by the network.

The scheduled entity may generate additional TA validation criteria that can be based on either individual or combined usage of a number of characteristics, including, but not limited to, a change of serving cell and/or transmission and reception points (TRPs), whether the TA timer configured for CG-SDT transmission has expired, and/or whether the variations of RSRP measurements on pre-configured DL beams have surpassed pre-configured thresholds. In this example, one or multiple beam indexes may be signaled to the UE 902, and one or more DL signals and their transmission power offsets can be signaled to the UE for RSRP measurements. Examples of such DL signals include synchronization signal/PBCH block (SSB), tracking reference signals (TRS), positioning reference signals (PRS), channel state information reference signals (CSI-RS), paging signals, wake-up signals (WUS), and demodulation reference signals (DMRS) of PBCH/paging/WUS. Alternately or in addition, TA validation criteria may also be based on positioning information that includes measurements obtained from a serving cell and/or neighbor cells. Example of positioning information includes timing of arrival (ToA) measurements, angle of arrival (AoA) measurements, reference signal time difference (RSTD) and so forth. Using any one or combination of the above criteria, the scheduling entity 904 generates TA validation criteria in 914 and transmits TA validation 916 for CG-SDT transmission 918.

In some examples, one or multiple SSB beams can be associated with each configured grant (CG) configuration for CG-SDT, where a TA validation mechanism for CG-SDT may be based on RSRP change of a subset of SSB beams. The subset of SSB beams may be configured as beams within a set of SSBs, configured per each or all CG configurations. In some examples, the subset of SSB beams includes beams within a set of all SSB beams that are activated, as indicated in SIB1, or a highest number of SSB beams that are measured to derive the subset for a UE across all CG configurations. The SSB beam subset for RSRP-based TA validation may be determined, for example, at least based on a configured absolute RSRP threshold.

For an RRC inactive/idle UE, the DL signals used for TA validation 916 (e.g., SSB, TRS, PRS) can be scheduled periodically and jointly with a WUS/paging signal. In some examples, the UE's 902 measurement gap can be configured to overlap or partially overlap with signaling from the WUS/paging/DRX-ON time period(s). The UE's 902 periodicity for CG-SDT transmission may also be configured to coincide with the UE's 902 DRX cycle. In some examples, the UE's 902 search space and PDCCH configuration for the CG-SDT response from the scheduling entity 904 may also be configured to overlap or partially overlap with signaling from the WUS/paging/DRX-ON time period(s). The time gap used between the DL signals used for TA validation and the CG-SDT signals may also be configured to be less than a specified threshold (e.g., 160 ms) in order for the UE 902 to meet UL initial transmission timing error requirements while transmitting CG-SDT.

The CG-SDT configuration may be triggered by the UE or the scheduling entity (gNB), and CG-SDT occasions of multiple UEs may be fully or partially overlapped. For two or more UEs, each UE may share time/frequency resources for CG-SDT transmission. UEs having the same capabilities, coverage enhancement, and/or UL traffic pattern may be grouped and assigned to the shared CG-SDT. The CG-SDT configuration may be transmitted by the scheduling entity via RRC signaling or MAC control element (MAC CE).

Figure 10:
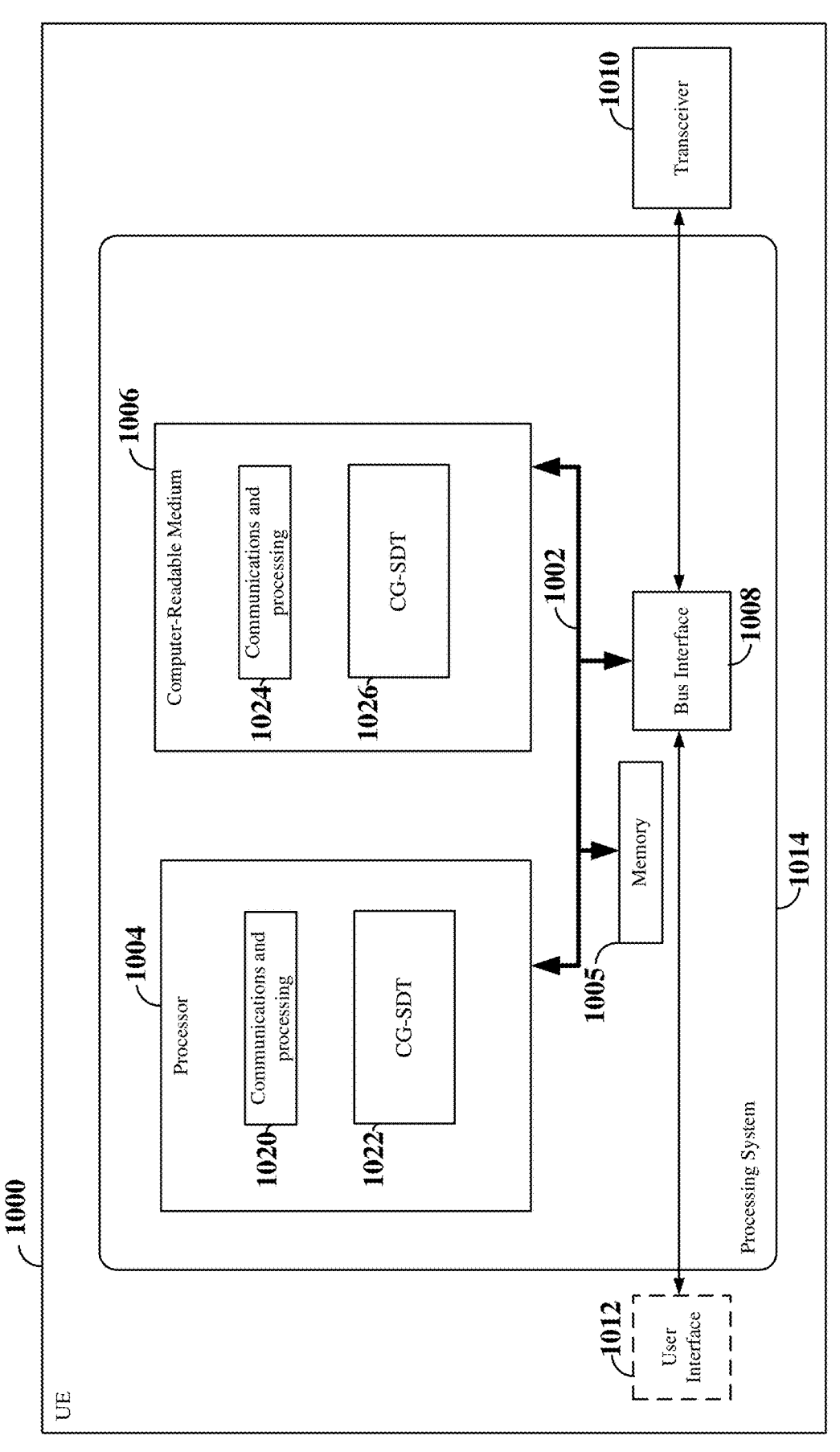
FIG. 10 is a block diagram illustrating an example of a hardware implementation for a UE employing a processing system according to some aspects.

FIG. 10 is a block diagram illustrating an example of a hardware implementation for a UE (scheduled entity) 1000 employing a processing system 1014 according to some aspects. For example, the scheduled entity 1000 may be a user equipment (UE) as illustrated in any one or more of FIGS. 1, 2, 6, 7 and/or 9.

The scheduled entity 1000 may be implemented with a processing system 1014 (or "processing apparatus") that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1000 may be configured to perform any one or more of the functions described herein, including, but not limited to, NR and NR light communications, including RACH procedures and CSI/CQI reporting as described above. That is, the processor 1004, as utilized in the scheduled entity 1000, may be used to implement any one or more of the processes and procedures described herein.

In this example, the processing system 1014 may be implemented with a bus architecture, represented generally by the bus 1002. The bus 1002 includes any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, display, speaker, microphone, joystick) may also be provided. Of course, such a user interface 1012 is optional, and may be omitted in some examples.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system 1014 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random-access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product includes a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 includes circuitry configured for various functions. For example, the processor 1004 includes communication and processing circuitry 1020, configured to communicate with a RAN node (e.g., a base station, such as a gNB). In some examples, the communication and processing circuitry 1020 includes one or more hardware components that provide the means and physical structure that performs processes related to wireless communication (e.g., signal reception and/or signal transmission) and signal processing (e.g., processing a received signal and/or processing a signal for transmission).

Communication and processing circuitry 1020 may obtain information from a component of the scheduled entity 1000 (e.g., from the transceiver 1010 that receives the information via radio frequency signaling or some other type of signaling suitable for the applicable communication medium), process (e.g., decode) the information, and output the processed information. For example, the communication and processing circuitry 1020 may output the information to another component of the processor 1004, to the memory 1005, or to the bus interface 1008. In some examples, the communication and processing circuitry 1020 may receive one or more of signals, messages, other information, or any combination thereof. In some examples, the communication and processing circuitry 1020 may receive information via one or more channels. In some examples, the communication and processing circuitry 1020 includes functionality for a means for receiving.

In some implementations where the communication involves sending (e.g., transmitting) information, the communication and processing circuitry 1020 may obtain information (e.g., from another component of the processor 1004, the memory 1005, or the bus interface 1008), process (e.g., encode) the information, and output the processed information. For example, the communication and processing circuitry 1020 may output the information to the transceiver 1010 (e.g., that transmits the information via radio frequency signaling or some other type of signaling suitable for the applicable communication medium). In some examples, the communication and processing circuitry 1020 may send one or more of signals, messages, other information, or any combination thereof. In some examples, the communication and processing circuitry 1020 may send information via one or more channels. In some examples, the communication and processing circuitry 1020 includes functionality for a means for sending (e.g., means for transmitting).

In some examples, the communication and processing circuitry 1020 may be configured to receive and process downlink beamformed signals at a mmWave frequency or a sub-6 GHz frequency via the transceiver 1010. For example, the communication and processing circuitry 1020 may be configured to receive a respective reference signal on each of a plurality of downlink beams from the RAN node during a beam sweep. The communication and processing circuitry 1020 may further be configured to receive a paging message from the RAN node. The communication and processing circuitry 1020 may further be configured to execute communication and processing software 1024 stored in the computer-readable medium 1006 to implement one or more of the functions described herein.

The processor 1004 may further include CG-SDT circuitry 1022 configured to process CG-SDT signaling and TA validation from the scheduling entity to enable grant-free processing and procedures as described above in connection with FIGS. 7-9. The CG-SDT circuitry 1022 may further be configured to execute CG-SDT software 1026 stored in the computer-readable medium 1006 to provide means for implementing one or more of the functions described herein.

Of course, in the above examples, the circuitry included in the processor 1014 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1-2 and 4, and utilizing, for example, the processes and/or algorithms described herein.

Figure 11:
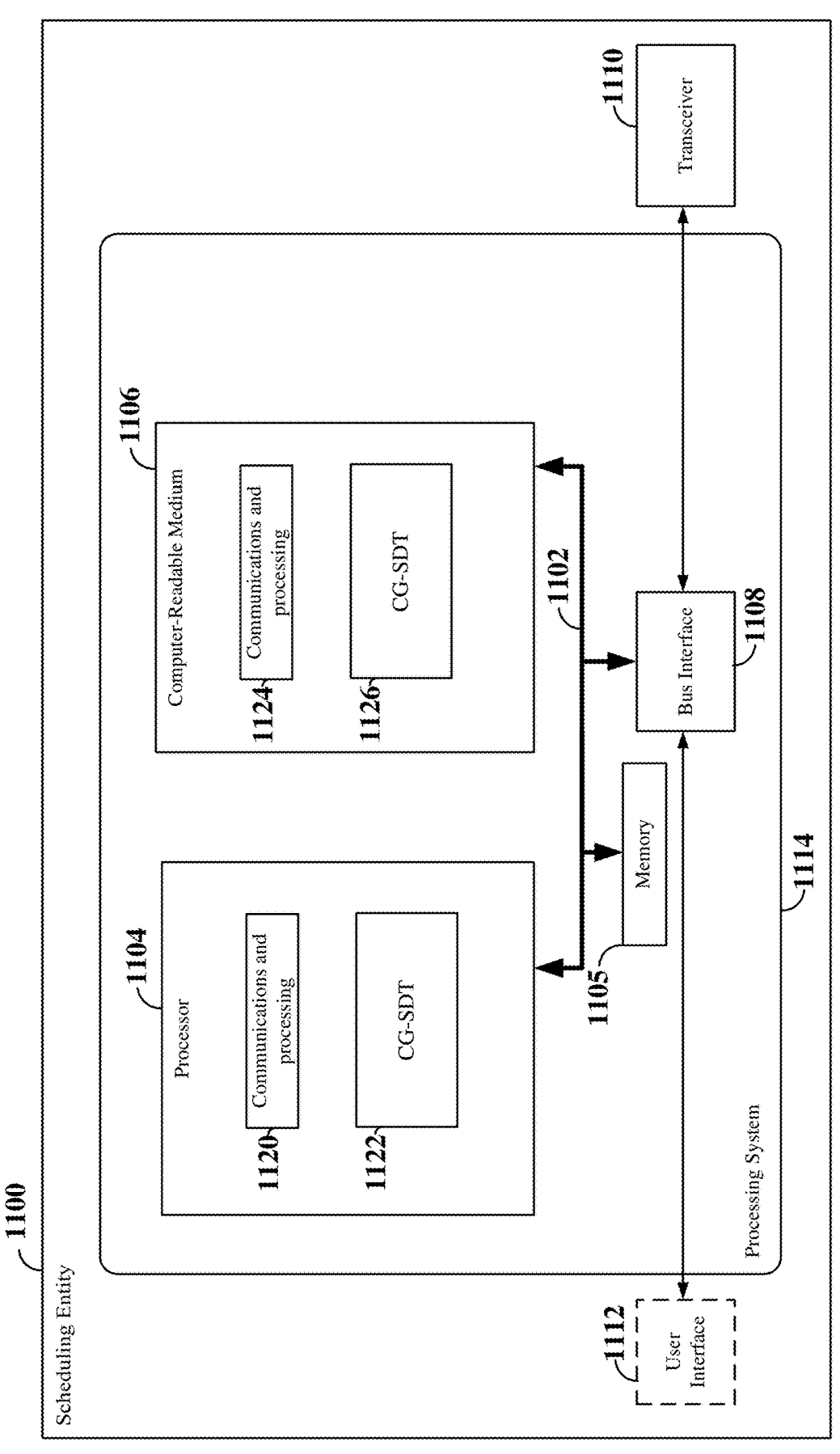
FIG. 11 is a block diagram illustrating an example of a hardware implementation for a scheduling entity employing a processing system according to some aspects.

FIG. 11 is a block diagram illustrating an example of a hardware implementation for a scheduling entity 1100 employing a processing system according to some aspects. The scheduling entity 1100 is shown employing a processing system 1114. For example, the scheduling entity 1100 may be a base station (such as eNB, gNB), or other scheduling entity as illustrated in any one or more of FIGS. 1 and 2.

The scheduling entity 1100 may be implemented with a processing system 1114 similar to processing system 1114 discussed above in connection with FIG. 11, and includes one or more processors 1104 that may be used to implement any one or more of the processes and procedures described herein. In this example, the processing system 1114 may be implemented with a bus architecture, represented generally by the bus 1102. The bus 1102 includes any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 also may link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium (such as air). Depending upon the nature of the apparatus, a user interface 1112 (such as keypad, display, speaker, microphone, joystick, touchscreen) also may be provided. Of course, such a user interface 1112 is optional, and may be omitted in some examples.

The processor 1104 is responsible for managing the bus 1102 and general processing, including the execution of software stored on the computer-readable medium 1106 or memory 1105. The software, when executed by the processor 1104, causes the processing system 1114 to perform the various functions described herein for any particular apparatus. The computer-readable medium 1106 and the memory 1105 also may be used for storing data that is manipulated by the processor 1104 when executing software. One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106, which may be similar to computer-readable medium 1106 described in FIG. 10.

In some aspects of the disclosure, the processor 1104 includes communication and processing circuitry 1120. The communication and processing circuitry 1120 may be configured to communicate with a UE. The communication and processing circuitry 1120 includes one or more hardware components that provide the physical structure that performs various processes related to communication (e.g., signal reception and/or signal transmission) as described herein. The communication and processing circuitry 1120 may further include one or more hardware components that provide the physical structure that performs various processes related to signal processing (e.g., processing a received signal and/or processing a signal for transmission) as described herein. The communication and processing circuitry 1120 may further be configured to execute communication and processing software 1124 included on the computer-readable medium 1106 to implement one or more functions described herein.

In some examples, the communication and processing circuitry 1120 may be configured to receive and process uplink beamformed signals at a mmWave frequency or a sub-6 GHz frequency via the transceiver 1110. For example, the communication and processing circuitry 1120 may be configured to receive a respective reference signal (e.g., SRS or DMRS) on each of a plurality of uplink beams from the UE during an uplink beam sweep. In some examples, the communication and processing circuitry 1120 may further be configured to generate and transmit downlink beamformed signals at a mmWave frequency or a sub-6 GHz frequency via the transceiver 1110. For example, the communication and processing circuitry 1120 may be configured to transmit a respective downlink reference signal (e.g., SSB or CSI-RS) on each of a plurality of downlink beams to the UE during a downlink beam sweep.

The communication and processing circuitry 1120 may further be configured to receive a request from the UE. For example, the request may be included in a MAC-CE carried in a PUSCH, UCI in a PUCCH or PUSCH, a random-access message, an RRC, and/or a CG-SDT configuration request message. The communication and processing circuitry 1120 may further be configured to receive a scheduling request (e.g., via UCI in a PUCCH) from the UE for an uplink grant for the PUSCH carrying the MAC-CE. The communication and processing circuitry 1120 may further be configured to receive an uplink signal on one or more uplink receive beams via one or more uplink transmit beams applied to the uplink signal. For example, the communication and processing circuitry 1120 may be configured to receive the uplink signal on one or more uplink receive beams. The uplink signal includes, for example, a PUCCH, PUSCH, SRS, DMRS, or PRACH.

The communication and processing circuitry 1120 may further be configured to generate a plurality of downlink transmit beams during a downlink beam sweep. In some implementations where the communication involves receiving information, the communication and processing circuitry 1120 may obtain information from a component of the scheduling entity 1100 (e.g., from the transceiver 1110 that receives the information via radio frequency signaling or some other type of signaling suitable for the applicable communication medium), process (e.g., decode) the information, and output the processed information. For example, the communication and processing circuitry 1120 may output the information to another component of the processor 1104, to the memory 1105, or to the bus interface 1108. In some examples, the communication and processing circuitry 1120 may receive one or more of signals, messages, other information, or any combination thereof. In some examples, the communication and processing circuitry 1120 may receive information via one or more channels. In some examples, the communication and processing circuitry 1120 includes functionality for a means for receiving.

In some implementations where the communication involves sending (e.g., transmitting) information, the communication and processing circuitry 1120 may obtain information (e.g., from another component of the processor 1104, the memory 1105, or the bus interface 1108), process (e.g., encode) the information, and output the processed information. For example, the communication and processing circuitry 1120 may output the information to the transceiver 1110 (e.g., that transmits the information via radio frequency signaling or some other type of signaling suitable for the applicable communication medium). In some examples, the communication and processing circuitry 1120 may send one or more of signals, messages, other information, or any combination thereof. In some examples, the communication and processing circuitry 1120 may send information via one or more channels. In some examples, the communication and processing circuitry 1120 includes functionality for a means for sending (e.g., means for transmitting).

The processor 1104 may further include CG-SDT circuitry 1122 that may operate in conjunction with communications and processing circuitry 1120 to configure a CG-SDT transmission, including a TA validation. The CG-SDT circuitry 1122 may further be configured to execute CG-SDT software 1126 stored in the computer-readable medium 1106 to provide means for implementing one or more of the functions described herein. In some examples, the CG-SDT circuitry 1122, alone or in combination with communication and processing circuitry 1120, may be configured as a means to receive a configured grant small data transmission (CG-SDT) configuration request from a user equipment (UE) and transmit a CG-SDT configuration to the UE in response to receiving the CG-SDT configuration request, the CG-SDT configuration including a timing advance (TA) validation criteria based on downlink signal quality measurements meeting configured thresholds.

Of course, in the above examples, the circuitry included in the processor 1114 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1-2, 4, 6-7 and 9, and utilizing, for example, the processes and/or algorithms described herein.

Figure 12:
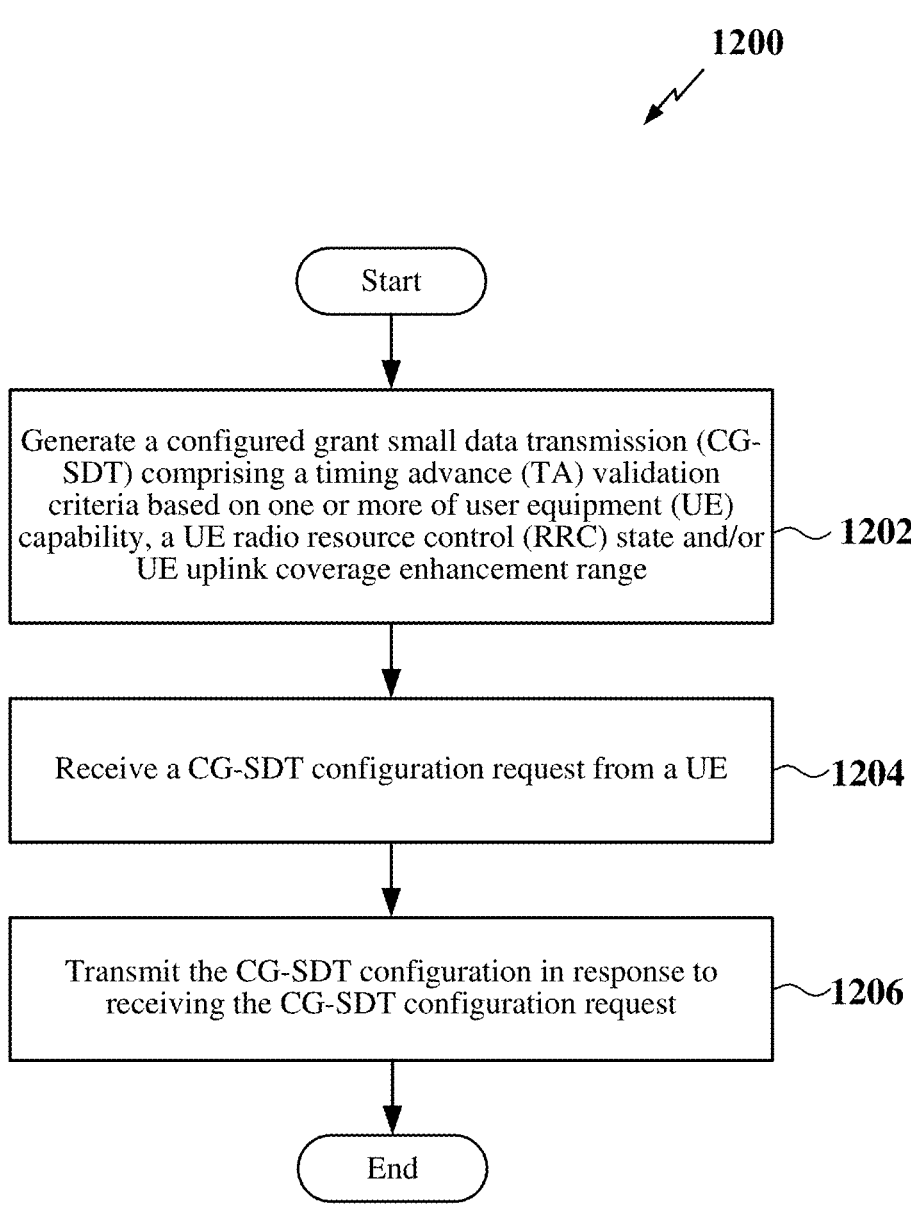
FIG. 12 is a flow chart illustrating an exemplary process for a scheduling entity implementing a CG-SDT procedure with enhanced TA validation according to some aspects.

FIG. 12 is a flow chart illustrating an exemplary process 1200 for a scheduling entity implementing a CG-SDT procedure with enhanced TA validation according to some aspects. As described below, some or all illustrated features may be omitted in a particular implementation within the scope of the present disclosure, and some illustrated features may not be required for implementation of all examples. In some examples, the process 1200 may be carried out by a scheduling entity (e.g., 1100). In some examples, the process 1200 may be carried out by any suitable apparatus or means for carrying out the functions or algorithms described below.

In block 1202, a scheduling entity may generate a CG-SDT configuration comprising a timing advance (TA) validation criteria based on one or more of user equipment (UE) capability, a UE radio resource control (RRC) state, UE uplink coverage enhancement range (e.g., 906-912). For example, the CG-SDT circuitry 1122 shown and described in connection with FIG. 11 may provide a means for generating a CG-SDT configuration. In some examples, the UE capability includes subscription information such as low-category UE, normal UE, or premium UE subscription information. In some examples, the RRC state includes one of an inactive state, an idle state and a connected state. For one of the inactive state or idle state, the transmitting of the CG-SDT configuration includes transmitting the CG-SDT on a periodic schedule together with one of a wake-up signal (WUS), paging signal, or a discontinuous reception on (DRX-ON) signal.

In some examples, transmitting the CG-SDT configuration includes transmitting a measurement gap configuration that at least partially overlaps with the WUS, paging signal, or DRX-ON time period. The periodic schedule includes a DRX cycle, jointly configured with a CG-SDT transmission periodicity. A search space configuration and PDCCH configuration may also be transmitted that at least partially overlaps with the WUS, paging signal, or DRX-ON time period.

In some examples, the UE uplink coverage enhancement range includes a number of PUSCH repetition levels, and the UE uplink coverage enhancement range includes a number of aggregated PUSCH slots. The TA validation criteria may also include one or more of a detected change of a serving cell or transmission and reception point (TRP), a TA timer configuration, a variation of RSRP measurements on preconfigured downlink beams surpassing one or more thresholds, and positioning information.

In some examples, transmitting the CG-SDT configuration to UE includes transmitting CG-SDT configuration parameters for the UE, downlink reference signals or channels used by the UE for TA validation and the TA validation criteria for the UE, and wherein a time gap between the downlink reference signals or channels used by UE for TA validation and the PUR transmission from UE is less than a configured threshold.

In some examples, transmitting the CG-SDT configuration includes transmitting a common CG-SDT configuration information to a plurality of user equipment (UEs). The common CG-SDT configuration information may be transmitted on a shared radio resource in a time or frequency domain, using one or multiple beams which have quasi-colocation (QCL) relationship with other DL broadcast beams. The CG-SDT configuration may be transmitted via one or radio resource control (RRC) signaling or MAC control element (MAC CE).

In some examples, the CG-SDT configuration includes one or more of (i) the TA validation criteria, (ii) a periodic allocation of time-frequency resources for a Physical Uplink Shared Channel (PUSCH), (iii) a modulation and coding scheme (MCS) 806 and transport block size (TB S) of PUSCH, (iv) a number of PUSCH repetitions per CG-SDT occasion and repetition pattern, (v) a demodulation reference signal (DMRS) configuration, (vi) a CG-SDT radio network temporary identifier (C-RNTI), (vii) power control parameters, (viii) a number of CG-SDT skips allowed, and/or (ix) a Physical Downlink Control Channel (PDCCH) search space and PDCCH configuration for CG-SDT response.

In block 1204, the scheduling entity may receive a CG-SDT configuration request from a UE, where, based on the TA validation criteria, the scheduling entity transmits the CG-SDT in response to receiving the CG-SDT configuration request in block 1206. For example, the communications and processing circuitry 1120 and CG-SDT circuitry 1122 shown and described in connection with FIG. 11 may provide a means for transmitting the CG-SDT configuration.

FIG. 13 is a flow chart illustrating an exemplary process 1300 for a UE implementing a CG-SDT procedure with enhanced TA validation according to some aspects. As described below, some or all illustrated features may be omitted in a particular implementation within the scope of the present disclosure, and some illustrated features may not be required for implementation of all examples. In some examples, the process 1300 may be carried out by a scheduled entity (e.g., 1000). In some examples, the process 1300 may be carried out by any suitable apparatus or means for carrying out the functions or algorithms described below.

In block 1302, the UE may transmit a pre-configured uplink resource (CG-SDT) request. For example, the communications and processing circuitry 1020 and shown and described in connection with FIG. 10 may provide a means for transmitting the CG-SDT request.

In block 1304, the UE may receive a CG-SDT configuration comprising a timing advance (TA) validation criteria based on one or more of user equipment (UE) capability, a UE radio resource control (RRC) state, and/or UE uplink coverage enhancement range (e.g., 906-912). In block 1306, the UE validates the CG-SDT in accordance with one or more of the TA validation criteria and executes the CG-SDT. For example, the communications and processing circuitry 1020 shown and described in connection with FIG. 10 may provide a means for receiving the CG-SDT configuration, and the CG-SDT circuitry 1022 may provide a means for validating and executing the CG-SDT.

In some examples, the UE capability comprises subscription information that includes one of low-category UE, normal UE, or premium UE subscription information. In some examples, the RRC state includes one of an inactive state, an idle state and a connected state. For one of the inactive state or idle state, the receiving of the CG-SDT comprises receiving the CG-SDT on a periodic schedule together with one of a wake-up signal (WUS), paging signal, or a discontinuous reception on (DRX-ON) signal. Receiving the CG-SDT may also include receiving a measurement gap configuration that at least partially overlaps with the WUS, paging signal, or DRX-ON time period. The periodic schedule includes a DRX cycle. In some examples, receiving the CG-SDT may also include receiving a search space configuration and PDCCH configuration that at least partially overlaps with the WUS, paging signal, or DRX-ON time period.

In some examples, the UE uplink coverage enhancement range includes a number of PUSCH repetition levels or a number of aggregated PUSCH slots. The TA validation criteria includes one or more of a detected change of a serving cell or transmission and reception point (TRP), a TA timer configuration, a variation of RSRP measurements on preconfigured downlink beams surpassing one or more thresholds, and positioning information.

Receiving the CG-SDT includes receiving the CG-SDT and the TA validation on downlink signals, and wherein a time gap between the CG-SDT and the TA validation is less than a configured threshold. In some examples, receiving the CG-SDT includes receiving the CG-SDT on a shared transmission resource. Receiving the CG-SDT includes receiving the CG-SDT via one or radio resource control (RRC) signaling or MAC control element (MAC CE).

Figure 14:
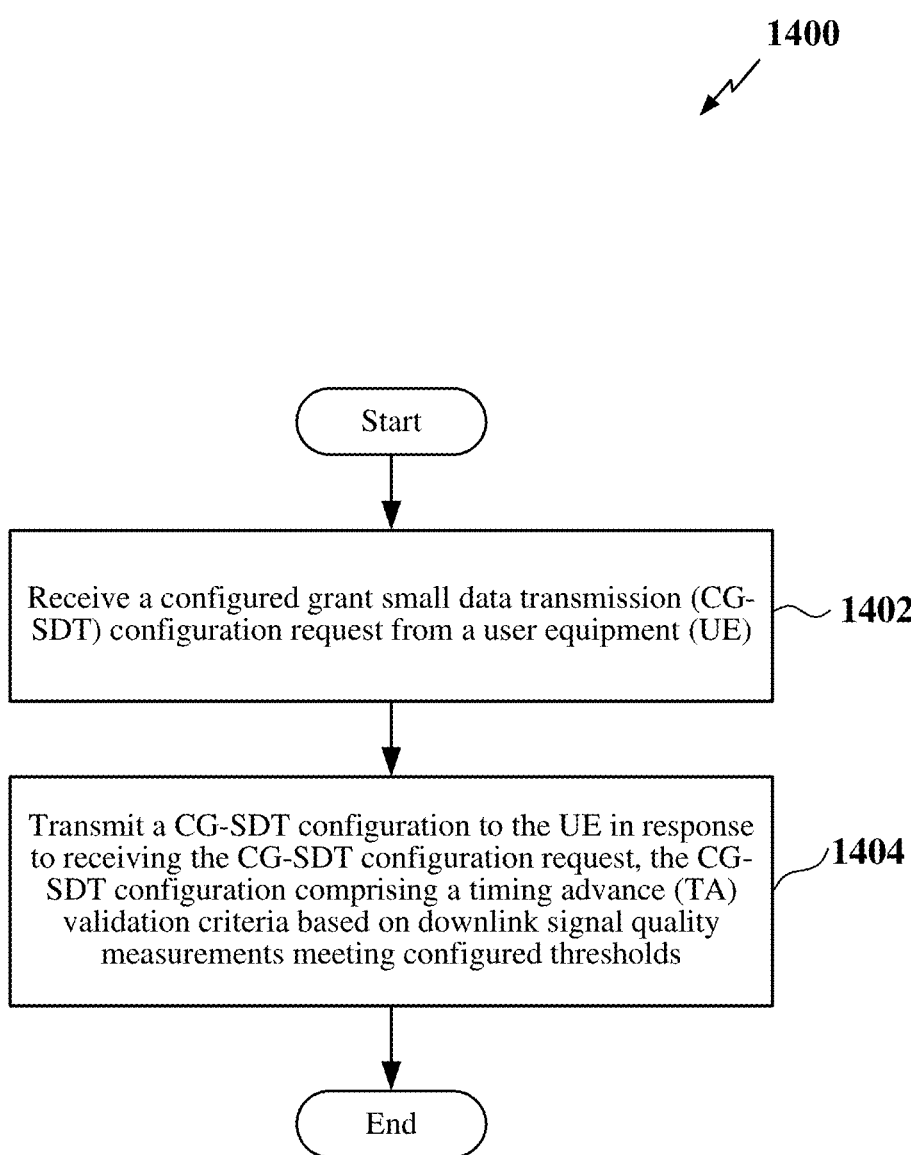
FIG. 14 is a flow chart is a flow chart illustrating another exemplary process for a scheduling entity implementing a CG-SDT procedure with enhanced TA validation according to some aspects.

FIG. 14 is a flow chart illustrating an exemplary process 1400 for a scheduling entity implementing a CG-SDT procedure with enhanced TA validation according to some aspects. As described below, some or all illustrated features may be omitted in a particular implementation within the scope of the present disclosure, and some illustrated features may not be required for implementation of all examples. In some examples, the process 1400 may be carried out by a scheduling entity (e.g., 1100). In some examples, the process 1400 may be carried out by any suitable apparatus or means for carrying out the functions or algorithms described below.

In block 1402, a scheduling entity receives a configured grant small data transmission (CG-SDT) configuration request from a user equipment (UE). For example, the CG-SDT circuitry 1122 shown and described in connection with FIG. 11 may provide a means for receiving a CG-SDT configuration request.

In block 1404, the scheduling entity transmits a CG-SDT configuration to the UE in response to receiving the CG-SDT configuration request, the CG-SDT configuration comprising a timing advance (TA) validation criteria based on downlink signal quality measurements meeting configured thresholds. For example, the CG-SDT circuitry 1122 and communication and processing circuitry 1120 shown and described in connection with FIG. 11 may provide a means for transmitting the CG-SDT configuration based on downlink signal quality information, meeting configured thresholds. In some examples, the configured thresholds comprise one or more thresholds for received power (RSRP) measurements or a variation in RSRP measurements. In some examples, the TA validation criteria is further based on one or more of at least one downlink signal quality measurement configuration, at least one downlink reference signal, a respective beam index of each of the at least one downlink reference signal, positioning information obtained from at least one of a serving cell or one or more neighbor cells, a respective transmit power offset of each of the at least one downlink references signal, a UE capability, a UE radio resource control (RRC) state, a UE uplink coverage enhancement for a CG-SDT transmission, a detected change of a serving cell or transmission and reception point (TRP), and a TA timer configuration..

In some examples, the UE RRC state comprises one of an inactive state, an idle state and a connected state. For one of the inactive state or idle state, the transmitting of the CG-SDT configuration comprises transmitting the CG-SDT on a periodic schedule together with one of a wake-up signal (WUS), paging signal, or a discontinuous reception on (DRX-ON) signal. The CG-SDT configuration includes a measurement gap configuration that at least partially overlaps with the WUS, paging signal, or DRX-ON time period. The periodic schedule includes a DRX cycle, jointly configured with a CG-SDT transmission periodicity. The CG-SDT configuration includes a search space configuration and PDCCH configuration that at least partially overlaps with the WUS, paging signal, or DRX-ON time period. In some examples, the UE uplink coverage enhancement range includes a number of PUSCH repetition levels, or a number of aggregated PUSCH slots.

In some examples, the CG-SDT configuration includes CG-SDT configuration parameters for the UE, downlink reference signals or channels used by the UE for TA validation and the TA validation criteria for the UE, and wherein a time gap between the downlink reference signals or channels used by the UE for TA validation and the CG-SDT transmission from the UE is less than a configured time threshold (e.g., time gap threshold between the DL channels/signals used for TA validation and the CG-SDT UL data transmission).

In some examples, the CG-SDT configuration may be transmitted as common CG-SDT configuration information to a plurality of user equipment (UEs), and wherein transmitting the CG-SDT configuration comprises transmitting the common CG-SDT configuration information on a shared radio resource in a time or frequency domain, using one or multiple beams which have quasi-colocation (QCL) relationship with other DL broadcast beams.

Figure 15:
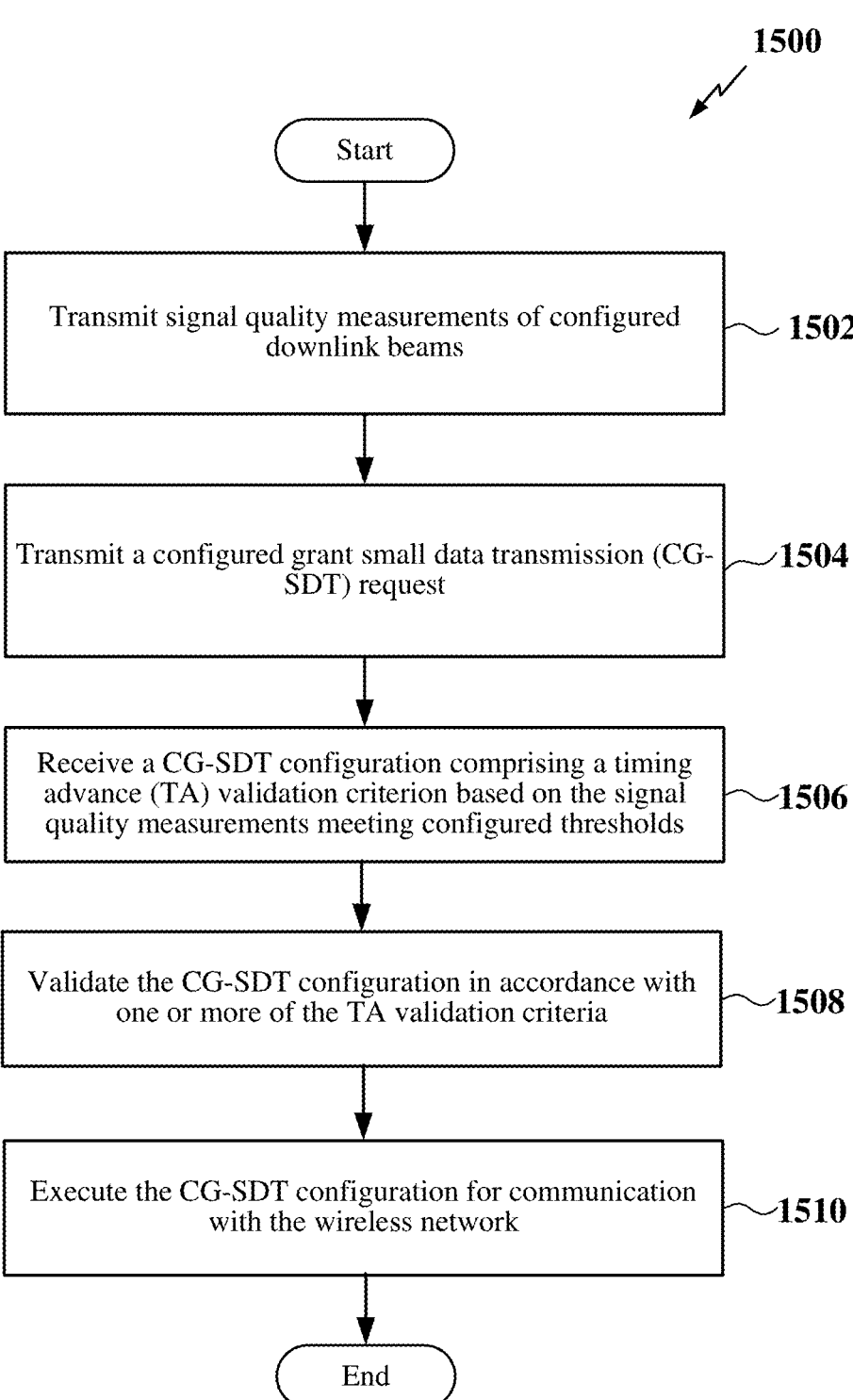
FIG. 15 is a flow chart illustrating another exemplary process for a UE implementing a CG-SDT procedure with enhanced TA validation according to some aspects.

FIG. 15 is a flow chart illustrating an exemplary process 1500 for a UE implementing a CG-SDT procedure with enhanced TA validation according to some aspects. As described below, some or all illustrated features may be omitted in a particular implementation within the scope of the present disclosure, and some illustrated features may not be required for implementation of all examples. In some examples, the process 1500 may be carried out by a scheduled entity (e.g., 1000). In some examples, the process 1500 may be carried out by any suitable apparatus or means for carrying out the functions or algorithms described below.

In block 1502, the UE transmits signal quality measurements of configured downlink beams. For example, the communications and processing circuitry 1020 and CG-SDT circuitry 1022 shown and described in connection with FIG. 10 may provide a means for transmitting signal quality information of configured downlink beams. In some examples, the signal quality measurements include received power (RSRP) measurements or a variation in RSRP measurements. In some examples, the signal quality measurements may include additional information for use in TA validation criterion, including at least one of downlink signal quality measurements configurations comprising one or more of at least one downlink reference signal, at least one downlink signal quality measurement configuration, beam indexes of downlink reference signals, positioning information obtained from serving cell or neighbor cells, transmit power offsets of the downlink references signals, and at least one of UE capability, a UE radio resource control (RRC) state, a UE uplink coverage enhancement for CG-SDT transmission, a detected change of a serving cell or transmission and reception point (TRP), a TA timer configuration, and positioning information.

In block 1504, the UE transmits a configured grant small data transmission (CG-SDT) request. For example, the communications and processing circuitry 1020 shown and described in connection with FIG. 10 may provide a means for transmitting the CG-SDT request.

In block 1506, the UE receives a CG-SDT configuration comprising a timing advance (TA) validation criterion based on the signal quality measurements meeting configured thresholds. For example, the communications and processing circuitry 1020 shown and described in connection with FIG. 10 may provide a means for receiving the CG-SDT configuration.

In some examples, the configured thresholds comprise one or more thresholds for received power (RSRP) measurements or a variation in RSRP measurements, and wherein the TA validation criterion may also include at least one of downlink signal quality measurements configurations comprising one or more of at least one downlink reference signal, at least one downlink signal quality measurement configuration, beam indexes of downlink reference signals, positioning information obtained from serving cell or neighbor cells, transmit power offsets of the downlink references signals, and at least one of UE capability, a UE radio resource control (RRC) state, a UE uplink coverage enhancement for CG-SDT transmission, a detected change of a serving cell or transmission and reception point (TRP), a TA timer configuration, and positioning information.

In some examples, the CG-SDT configuration and TA validation are received via downlink signals, wherein a time gap between the CG-SDT and the TA validation is less than a configured threshold. In some examples, the CG-SDT configuration is received as common CG-SDT configuration information on a shared radio resource in a time or frequency domain, using one or multiple beams which have quasi-colocation (QCL) relationship with other DL broadcast beams.

In block 1508, the UE validates the CG-SDT configuration in accordance with one or more of the TA validation criteria. In block 1510, the UE executes the CG-SDT configuration for small data communication with the wireless network. For example, the CG-SDT circuitry 1022 shown and described in connection with FIG. 10 may provide a means for validating and executing the CG-SDT configuration.

The following provides an overview of examples of the present disclosure.

Example 1: A scheduling entity within a wireless communication network, comprising: a transceiver; a memory; and a processor communicatively coupled to the transceiver and the memory, wherein the processor and the memory are configured to: receive a configured grant small data transmission (CG-SDT) configuration request from a user equipment (UE); and transmit a CG-SDT configuration to the UE in response to receiving the CG-SDT configuration request, the CG-SDT configuration comprising a timing advance (TA) validation criteria based on downlink signal quality measurements meeting configured thresholds.

Example 2: The scheduling entity of example 1, wherein the configured thresholds comprise one or more thresholds for received power (RSRP) measurements or a variation in RSRP measurements.

Example 3: The scheduling entity of example 1 and/or 2, wherein the TA validation criteria is further based on one or more of at least one downlink signal quality measurement configuration, at least one downlink reference signal, a respective beam index of each of the at least one downlink reference signal, positioning information obtained from at least one of a serving cell or one or more neighbor cells, a respective transmit power offset to be applied to the downlink signal quality measurements for each of the at least one downlink references signal, a UE capability, a UE radio resource control (RRC) state, a UE uplink coverage enhancement for a CG-SDT transmission, a detected change of a serving cell or transmission and reception point (TRP), or a TA timer configuration.

Example 4: The scheduling entity of any of examples 1 through 3, wherein the UE RRC state comprises one of an inactive state, an idle state and a connected state.

Example 5: The scheduling entity of any of examples 1 through 4, wherein, for one of the inactive state or idle state, the processor and the memory are configured to transmit the CG-SDT configuration via one of Radio Resource Control (RRC) signaling or a Medium Access Control (MAC) Control Element (MAC CE), and transmit one or more downlink reference signals for TA validation of the CG-SDT on a periodic schedule together with one of a wake-up signal (WUS) or a paging signal within a discontinuous reception (DRX) time period.

Example 6: The scheduling entity of any of examples 1 through 5, wherein the processor and the memory are configured to transmit the one or more downlink reference signals within a measurement gap that at least partially overlaps with a WUS occasion, a paging occasion, or a DRX-ON time period of the UE configured with CG-SDT resources.

Example 7: The scheduling entity of any of examples 1 through 6, wherein the periodic schedule for CG-SDT transmission is jointly configured with a DRX cycle, and the periodicity of CG-SDT transmission is configured to be proportional to a periodicity of the DRX cycle.

Example 8: The scheduling entity of any of examples 1 through 7, wherein the processor and the memory are configured to transmit the CG-SDT configuration by transmitting a search space configuration and PDCCH configuration that at least partially overlap with a WUS occasion, a paging occasion or a DRX-ON time period of the UE configured with CG-SDT resources.

Example 9: The scheduling entity of any of examples 1 through 8, wherein the

UE uplink coverage enhancement comprises a number of PUSCH repetition levels, a number of aggregated PUSCH slots, or a PUSCH repetition pattern comprising at least frequency hopping, redundancy version cycling and DMRS configuration.

Example 10: The scheduling entity of any of examples 1 through 9, wherein the processor and the memory are configured to transmit the CG-SDT configuration to the UE by transmitting CG-SDT configuration parameters for the UE, downlink reference signals or channels used by the UE for TA validation and the TA validation criteria for the UE, and wherein a time gap between the downlink reference signals or channels used by the UE for TA validation and the CG-SDT transmission from the UE is no less than a configured time threshold.

Example 11: The scheduling entity of any of examples 1 through 10, wherein the processor and the memory are configured to transmit the CG-SDT configuration by transmitting a common or separate CG-SDT configuration information to a plurality of user equipment (UEs), and wherein the processor and the memory are configured to transmit the CG-SDT configuration by transmitting the common or a separate CG-SDT configuration information on a shared or partially overlapped radio resource in a time or frequency domain, using one or multiple beams which have quasi-colocation (QCL) relationship with other DL broadcast beams.

Example 12: A method of wireless communication of a scheduling entity in a wireless communication network, the method comprising: receiving a configured grant small data transmission (CG-SDT) configuration request from a user equipment (UE); and transmitting a CG-SDT configuration comprising the TA validation criteria to the UE in response to receiving the CG-SDT configuration request, the CG-SDT configuration comprising a timing advance (TA) validation criteria based on one or more downlink signal quality measurements meeting configured thresholds.

Example 13: The method of example 12, wherein the downlink signal quality measurements comprise reference signal received power (RSRP) measurements or a variation in RSRP measurements.

Example 14: The method of example 12 and/or 13, wherein the TA validation criteria is further based on one or more of at least one downlink signal quality measurement configuration, at least one downlink reference signal, a respective beam index of each of the at least one downlink reference signal, positioning information obtained from at least one of a serving cell or one or more neighbor cells, a respective transmit power offset to be applied to the downlink signal quality measurements for each of the at least one downlink references signal, a UE capability, a UE radio resource control (RRC) state, a UE uplink coverage enhancement for a CG-SDT transmission, a detected change of a serving cell or transmission and reception point (TRP), or a TA timer configuration.

Example 15: The method of any of examples 12 through 14, wherein the UE RRC state comprises one of an inactive state, an idle state and a connected state.

Example 16: The method of any of examples 12 through 15, wherein, for one of the inactive state or idle state, the transmitting of the CG-SDT configuration comprises transmitting the CG-SDT configuration via one of Radio Resource Control (RRC) signaling or MAC Control Element (MAC CE), and transmitting downlink reference signals for TA validation of CG-SDT on a periodic schedule together with one of a wake-up signal (WUS) or a paging signal within a discontinuous reception (DRX) time period.

Example 17: The method of any of examples 12 through 16, wherein transmitting the CG-SDT configuration further comprises transmitting the downlink reference signals within a measurement gap configuration that at least partially overlaps with a WUS occasion, a paging occasion, or a DRX-ON time period of the UE configured with CG-SDT resources.

Example 18: The method of any of examples 12 through 17, wherein the periodic schedule is jointly configured with a DRX cycle, and the periodicity of CG-SDT configuration transmission is configured to be proportional to a periodicity of the DRX cycle.

Example 19: The method of any of examples 12 through 18, wherein transmitting the CG-SDT configuration further comprises transmitting a search space configuration and PDCCH configuration that at least partially overlaps with a WUS occasion, paging occasion, or a DRX-ON time period of the UE configured with CG-SDT resources.

Example 20: The method of any of examples 12 through 19, wherein the UE uplink coverage enhancement range comprises a number of PUSCH repetition levels, or a number of aggregated PUSCH slots, or a PUSCH repetition pattern including at least frequency hopping, redundancy version cycling and DMRS configuration.

Example 21: The method of any of examples 12 through 20, wherein transmitting the CG-SDT configuration to the UE comprises transmitting CG-SDT configuration parameters for the UE, downlink reference signals or channels used by the UE for TA validation and the TA validation criteria for the UE, and wherein a time gap between the downlink reference signals or channels used by the UE for TA validation and the CG-SDT transmission from the UE is less than a configured time threshold.

Example 22: The method of any of examples 12 through 21, wherein transmitting the CG-SDT configuration comprises transmitting a common or separate CG-SDT configuration information to a plurality of user equipment (UEs), and wherein transmitting the CG-SDT configuration comprises transmitting the common or separate CG-SDT configuration information on a shared or partially overlapped radio resource in a time or frequency domain, using one or multiple beams which have quasi-colocation (QCL) relationship with other DL broadcast beams.

Example 23: A user equipment (UE) within a wireless communication network, comprising: a transceiver; a memory; and a processor communicatively coupled to the transceiver and the memory, wherein the processor and the memory are configured to: transmit signal quality information of configured downlink beams; transmit a configured grant small data transmission (CG-SDT) request; receive a CG-SDT configuration comprising a timing advance (TA) validation criterion based on the signal quality measurements meeting configured thresholds; validate the TA for CG-SDT transmission in accordance with the TA validation criteria; and execute the CG-SDT configuration for communication with the wireless communication network.

Example 24: The UE of example 23, wherein the signal quality measurements comprise reference signal received power (RSRP) measurements or a variation in RSRP measurements, and wherein the TA validation criterion is further based on at least one of at least one downlink signal quality measurement configuration, at least one downlink reference signal, a respective beam index of each of the at least one downlink reference signal, positioning information obtained from at least one of a serving cell or one or more neighbor cells, a respective transmit power offset to be applied to the signal quality measurements for each of the at least one downlink references signal, a UE capability, a UE radio resource control (RRC) state, a UE uplink coverage enhancement for CG-SDT transmission, a detected change of a serving cell or transmission and reception point (TRP), or a TA timer configuration.

Example 25: The UE of example 23 and/or 24, wherein the processor and the memory are configured to perform the TA validation based on the TA validation criterion configured for CG-SDT transmission, and execute the CG-SDT configuration based on the outcome of TA validation, and wherein a time gap between the CG-SDT transmission and the TA validation is no less than a configured threshold.

Example 26: The UE of any of examples 23 through 25, wherein the processor and the memory are configured to receive the CG-SDT configuration by receiving a common or separate CG-SDT configuration information on a shared or partially overlapped radio resource in a time or frequency domain, using one or multiple beams which have quasi-colocation (QCL) relationship with other DL broadcast beams.

Example 27: A method of wireless communication of a user equipment (UE) in a wireless communication network, the method comprising: transmitting signal quality measurements of configured downlink beams; transmitting a configured grant small data transmission (CG-SDT) request; receiving a CG-SDT configuration comprising a timing advance (TA) validation criterion based on the signal quality measurements meeting configured thresholds; validating the TA for CG-SDT configuration transmission in accordance with one or more of the TA validation criteria; and executing the CG-SDT configuration for communication with the wireless network.

Example 28: The method of example 27, wherein the signal quality measurements comprise reference signal received power (RSRP) measurements or a variation in RSRP measurements, and wherein the TA validation criterion is further based on at least one of at least one downlink signal quality measurement configuration, at least one downlink reference signal, a respective beam index of each of the at least one downlink reference signal, positioning information obtained from at least one of a serving cell or one or more neighbor cells, a respective transmit power offset to be applied to the signal quality measurements for each of the at least one downlink references signal, a UE capability, a UE radio resource control (RRC) state, a UE uplink coverage enhancement for CG-SDT transmission, a detected change of a serving cell or transmission and reception point (TRP), or a TA timer configuration Example 29: The method of example 27 and/or 28, wherein the TA validation is based on the TA validation criterion configured for CG-SDT configuration transmission, and execution of the CG-SDT configuration is based on the outcome of TA validation, and wherein a time gap between the CG-SDT transmission and the TA validation is not less than or equal to a configured threshold.

Example 30: The method of any of examples 27 through 29, wherein receiving the CG-SDT configuration comprises receiving a common or separate CG-SDT configuration information on a shared or partially overlapped radio resource in a time or frequency domain, using one or multiple beams which have a quasi-colocation (QCL) relationship with other DL broadcast beams.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 7, 9 10 and 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A scheduling entity within a wireless communication network, comprising:
   a one or more memories; and
   a one or more processors coupled to the one or more memories, wherein the one or more processors are configured to:
      transmit a configured grant small data transmission (CG-SDT) configuration to a user equipment (UE), the CG-SDT configuration comprising timing advance (TA) validation criteria indicating that TA validation prior to a CG-SDT transmission be based on at least one downlink signal quality measurement meeting at least one threshold;
      transmit, on a periodic schedule together with one of a wake-up signal (WUS) or a paging signal within a discontinuous reception (DRX) time period, one or more downlink reference signals for TA validation; and
      receive a communication from the UE based on the CG-SDT configuration.

2. The scheduling entity of claim 1, wherein the downlink signal quality measurements comprise reference signal received power (RSRP) measurements or a variation in RSRP measurements.

3. The scheduling entity of claim 1, wherein the TA validation criteria also indicates one or more of:
   at least one downlink signal quality measurement configuration, at least one downlink reference signal, a respective beam index of each of the at least one downlink reference signal, positioning information obtained from at least one of a serving cell or one or more neighbor cells, a respective transmit power offset to be applied to the downlink signal quality measurements for each of the at least one downlink reference signal, a UE capability, a UE radio resource control (RRC) state, a UE uplink coverage enhancement for a CG-SDT transmission, a detected change of a serving cell or transmission and reception point (TRP), or a TA timer configuration.

4. The scheduling entity of claim 3, wherein the UE RRC state comprises one of an inactive state, an idle state and a connected state.

5. The scheduling entity of claim 4, wherein, for one of the inactive state or idle state, the one or more processors are configured to transmit the CG-SDT configuration via one of Radio Resource Control (RRC) signaling or a Medium Access Control (MAC) Control Element (MAC CE).

6. The scheduling entity of claim 1, wherein the one or more processors are configured to transmit the one or more downlink reference signals within a measurement gap that at least partially overlaps with a WUS occasion, a paging occasion, or a DRX-ON time period of the UE configured with CG-SDT resources.

7. The scheduling entity of claim 1, wherein the periodic schedule for a CG-SDT transmission is jointly configured with a DRX cycle, and the periodicity of the CG-SDT transmission is configured to be proportional to a periodicity of the DRX cycle.

8. The scheduling entity of claim 1, wherein the one or more processors are configured to transmit the CG-SDT configuration by transmitting a search space configuration and PDCCH configuration that at least partially overlap with a WUS occasion, a paging occasion, or a DRX-ON time period of the UE configured with CG-SDT resources.

9. The scheduling entity of claim 3, wherein the UE uplink coverage enhancement comprises a number of PUSCH repetition levels, a number of aggregated PUSCH slots, or a PUSCH repetition pattern comprising at least frequency hopping, redundancy version cycling and DMRS configuration.

10. The scheduling entity of claim 1, wherein the one or more processors are configured to transmit the CG-SDT configuration to the UE by transmitting CG-SDT configuration parameters for the UE, downlink reference signals or channels used by the UE for TA validation and the TA validation criteria for the UE, and wherein a time gap between the downlink reference signals or channels used by the UE for TA validation and the CG-SDT transmission from the UE is no less than a configured time threshold.

11. The scheduling entity of claim 1, wherein the one or more processors are configured to transmit the CG-SDT configuration by transmitting a common or separate CG-SDT configuration to a plurality of user equipment (UEs), and wherein the processor and the memory are configured to transmit the CG-SDT configuration by transmitting the common or a separate CG-SDT configuration on a shared or partially overlapped radio resource in a time or frequency domain, using one or multiple beams which have quasi-colocation (QCL) relationship with other DL broadcast beams.

12. A method of wireless communication of a scheduling entity in a wireless communication network, the method comprising:

transmitting a configured grant small data transmission (CG-SDT) configuration to a user equipment (UE), the CG-SDT configuration comprising timing advance (TA) validation criteria based on at least one downlink signal quality measurement meeting at least one threshold;

transmit, on a periodic schedule together with one of a wake-up signal (WUS) or a paging signal within a discontinuous reception (DRX) time period, one or more downlink reference signals for TA validation of a CG-SDT transmission receiving a communication from the UE based on the CG-SDT configuration.

13. The method of claim 12, wherein the downlink signal quality measurements comprise reference signal received power (RSRP) measurements or a variation in RSRP measurements.

14. The scheduling entity of claim 12, wherein the TA validation criteria also indicates one or more of:

at least one downlink signal quality measurement configuration, at least one downlink reference signal, a respective beam index of each of the at least one downlink reference signal, positioning information obtained from at least one of a serving cell or one or more neighbor cells, a respective transmit power offset to be applied to the downlink signal quality measurements for each of the at least one downlink reference signal, a UE capability, a UE radio resource control (RRC) state, a UE uplink coverage enhancement for a CG-SDT transmission, a detected change of a serving cell or transmission and reception point (TRP), or a TA timer configuration.

15. The method of claim 14, wherein the UE RRC state comprises one of an inactive state, an idle state and a connected state.

16. The method of claim 15, wherein, for one of the inactive state or idle state, the transmitting of the CG-SDT configuration comprises transmitting the CG-SDT configuration via one of Radio Resource Control (RRC) signaling or MAC Control Element (MAC CE).

17. The method of claim 12, wherein transmitting the CG-SDT configuration further comprises transmitting the downlink reference signals within a measurement gap configuration that at least partially overlaps with a WUS occasion, a paging occasion, or a DRX-ON time period of the UE configured with CG-SDT resources.

18. The method of claim 12, wherein the periodic schedule is jointly configured with a DRX cycle, and a periodicity of CG-SDT configuration transmission is configured to be proportional to a periodicity of the DRX cycle.

19. The method of claim 12, wherein transmitting the CG-SDT configuration further comprises transmitting a search space configuration and PDCCH configuration that at least partially overlaps with a WUS occasion, paging occasion, or a DRX-ON time period of the UE configured with CG-SDT resources.

20. The method of claim 14, wherein a range for the UE uplink coverage enhancement comprises a number of PUSCH repetition levels, or a number of aggregated PUSCH slots, or a PUSCH repetition pattern including at least frequency hopping, redundancy version cycling and DMRS configuration.

21. The method of claim 12, wherein transmitting the CG-SDT configuration to the UE comprises transmitting CG-SDT configuration parameters for the UE, downlink reference signals or channels used by the UE for TA validation and the TA validation criteria for the UE, and wherein a time gap between the downlink reference signals or channels used by the UE for TA validation and a CG-SDT transmission from the UE is no less than a configured time threshold.

22. The method of claim 12, wherein transmitting the CG-SDT configuration comprises transmitting a common or separate CG-SDT configuration to a plurality of user equipment (UEs), and wherein transmitting the CG-SDT configuration comprises transmitting the common or separate CG-SDT configuration on a shared or partially overlapped radio resource in a time or frequency domain, using one or multiple beams which have quasi-colocation (QCL) relationship with other DL broadcast beams.

* * * * *